(12) United States Patent
McCaffrey

(10) Patent No.: US 9,140,023 B2
(45) Date of Patent: Sep. 22, 2015

(54) PORTABLE ROBOTIC CASTING OF VOLUMETRIC MODULAR BUILDING COMPONENTS

(71) Applicant: Richard J. McCaffrey, Inverness, IL (US)

(72) Inventor: Richard J. McCaffrey, Inverness, IL (US)

( * ) Notice: Subject to any disclaimer, the term of this patent is extended or adjusted under 35 U.S.C. 154(b) by 0 days.

(21) Appl. No.: 14/446,271

(22) Filed: Jul. 29, 2014

(65) Prior Publication Data

US 2015/0030712 A1    Jan. 29, 2015

Related U.S. Application Data

(60) Provisional application No. 61/859,710, filed on Jul. 29, 2013.

(51) Int. Cl.
*E04G 19/00* (2006.01)
*E04G 11/20* (2006.01)

(52) U.S. Cl.
CPC ............... *E04G 19/00* (2013.01); *E04G 11/20* (2013.01)

(58) Field of Classification Search
CPC ......... E04G 11/28; E04G 19/00; E04G 11/20; E04G 11/34
USPC .............................................. 425/63; 249/13
See application file for complete search history.

(56) References Cited

U.S. PATENT DOCUMENTS

| | | | | |
|---|---|---|---|---|
| 1,995,692 A | * | 3/1935 | Urschel | 425/63 |
| 2,877,530 A | * | 3/1959 | Winn, Jr. | 425/60 |
| 3,372,430 A | * | 3/1968 | Lowes | 425/60 |
| 3,482,005 A | * | 12/1969 | Quentin | 264/33 |
| 3,591,123 A | * | 7/1971 | Edwards | 249/10 |
| 3,619,431 A | * | 11/1971 | Weaver et al. | 264/32 |
| 3,790,321 A | * | 2/1974 | Bunger | 425/63 |

(Continued)

OTHER PUBLICATIONS

Khoshnevis et al, Lunar Contour Crafting—A Novel Technique for ISRU—Based Habitat Development, Jan. 2005, American Institute of Aeronautics and Astronautics Conference, 12 pages.*

(Continued)

*Primary Examiner* — Yogendra Gupta
*Assistant Examiner* — Emmanuel S Luk
(74) *Attorney, Agent, or Firm* — John F. Rollins

(57) ABSTRACT

A robotic casting machine (RCM) provides for on-site, or near-site casting and automated production of cast components, such as concrete modular, volumetric building components. The RCM includes stationary and mobile support structures, which can be positioned in a loading configuration, a casting configuration and an ejection configuration in which the cast volumetric component may be ejected from the mold. Tipping machines located beneath the cast component facilitate ejection, rotation and loading of the ejected module onto a transport surface for transport of the module. The support structures are constructed of prefabricated frames that may include at least one standardized section, which may be utilized on every project, and may also include a customized section, which may be provided to achieve desired dimensions of the cast module on a particular project. A casting process is provided in which a volumetric module is cast in a rotated orientation, in which the floor is cast with an initial vertical orientation, the transverse walls extend in a horizontal orientation, which is cast in vertical wall forms, and a longitudinal wall extends horizontally along the top of the mold. Modular, volumetric components created using the RCM and casting process are also described.

20 Claims, 40 Drawing Sheets

(56) References Cited

U.S. PATENT DOCUMENTS

| | | | |
|---|---|---|---|
| 3,841,596 A * | 10/1974 | Cull | 249/20 |
| 3,966,533 A * | 6/1976 | Goldsworthy et al. | 156/379.8 |
| 3,993,720 A * | 11/1976 | Burdett | 264/33 |
| 4,193,750 A * | 3/1980 | Nielson | 425/60 |
| 4,371,325 A * | 2/1983 | Harbison | 425/63 |
| 4,761,126 A * | 8/1988 | del Valle | 425/62 |
| 4,824,350 A * | 4/1989 | Sommer et al. | 425/63 |
| RE32,936 E * | 5/1989 | Smith | 264/320 |
| 4,890,993 A * | 1/1990 | Wilson | 425/63 |
| 5,198,235 A * | 3/1993 | Reichstein et al. | 425/62 |
| 5,322,656 A * | 6/1994 | Pallesen | 264/87 |
| 5,379,860 A * | 1/1995 | Tang | 182/145 |
| 6,210,142 B1 * | 4/2001 | Huesers et al. | 425/60 |
| 6,276,912 B1 * | 8/2001 | Rock | 425/63 |
| 7,222,835 B2 * | 5/2007 | Marti-Lopez | 249/139 |
| 7,226,033 B2 * | 6/2007 | Foucher et al. | 249/44 |
| 8,393,593 B2 * | 3/2013 | Hoff | 249/120 |
| 2007/0096006 A1 * | 5/2007 | Pauley et al. | 249/20 |
| 2007/0181519 A1 * | 8/2007 | Khoshnevis | 212/180 |
| 2008/0138454 A1 * | 6/2008 | Perret et al. | 425/63 |
| 2009/0041879 A1 * | 2/2009 | Baum et al. | 425/63 |
| 2009/0051062 A1 * | 2/2009 | Wilkinson | 264/32 |
| 2010/0025349 A1 * | 2/2010 | Khoshnevis | 212/324 |
| 2010/0207288 A1 * | 8/2010 | Dini | 264/33 |
| 2011/0067351 A1 * | 3/2011 | Rotondo et al. | 52/742.15 |
| 2013/0020732 A1 * | 1/2013 | Jentsch | 264/33 |
| 2014/0283478 A1 * | 9/2014 | Horn et al. | 52/651.07 |

OTHER PUBLICATIONS

Khoshnevis et al, Mega-scale fabrication by contour crafting, 2006, Int J Industrial and Systems Engineering, vol. 1, No. 3, 20 pages.*

* cited by examiner

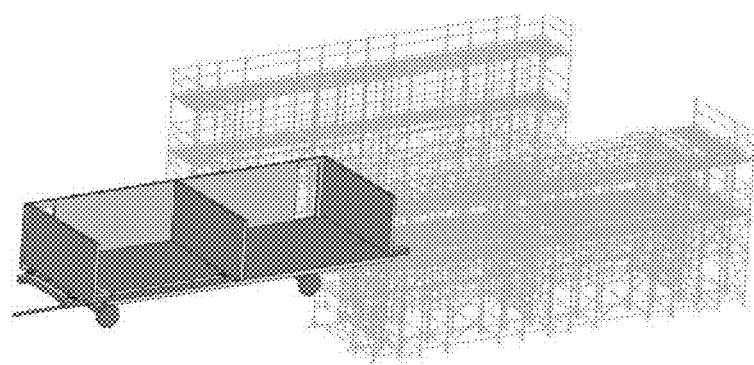
Fig. 10
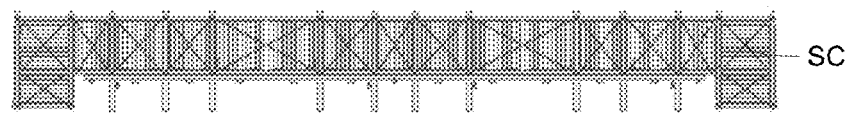
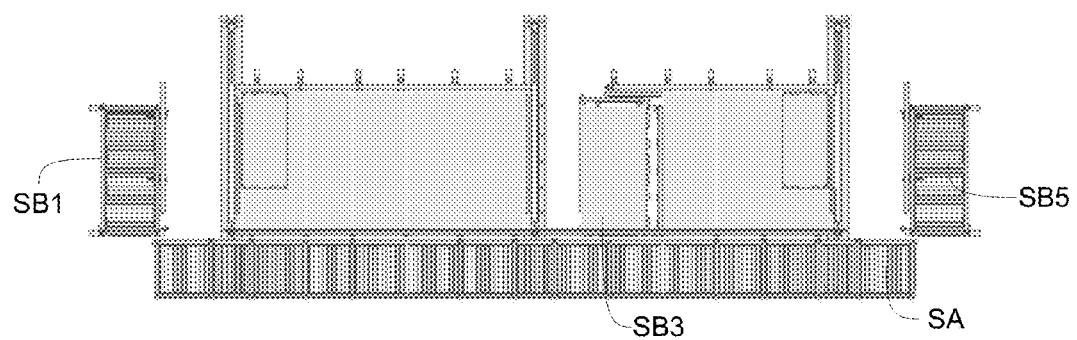
Fig. 11

Single-Unit Module

Double-Unit Module

Extender Module

Double-Unit Module

SB1  SB2  SB3  SB4  SB5

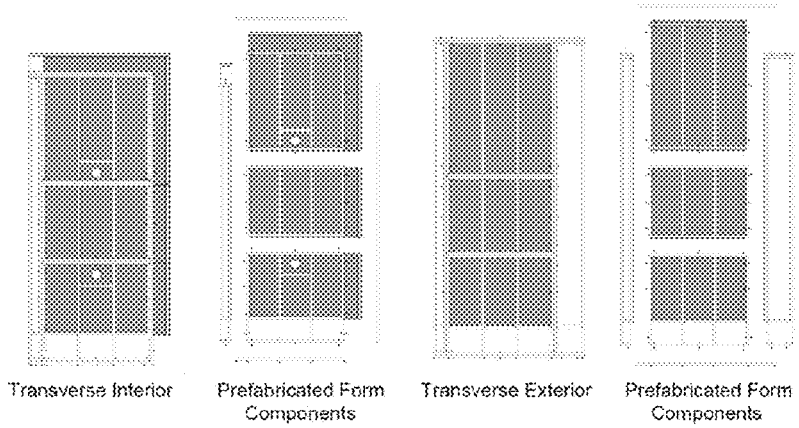
Transverse Interior    Prefabricated Form Components    Transverse Exterior    Prefabricated Form Components
FIG. 28
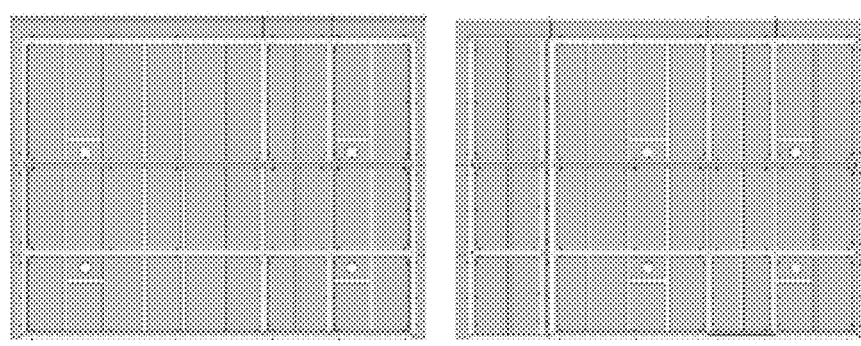
Longitudinal Interior – Front View
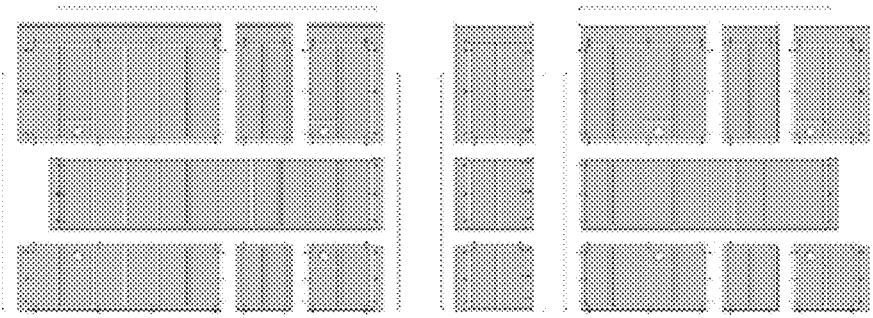
Prefabricated Form Components – Front View
FIG. 29
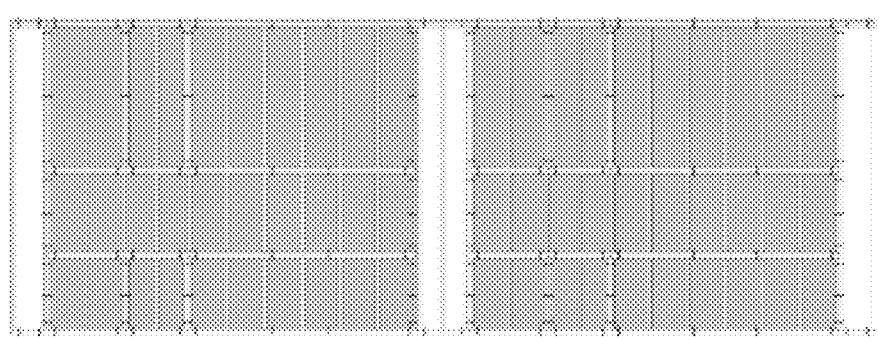
Longitudinal Exterior – Rear View

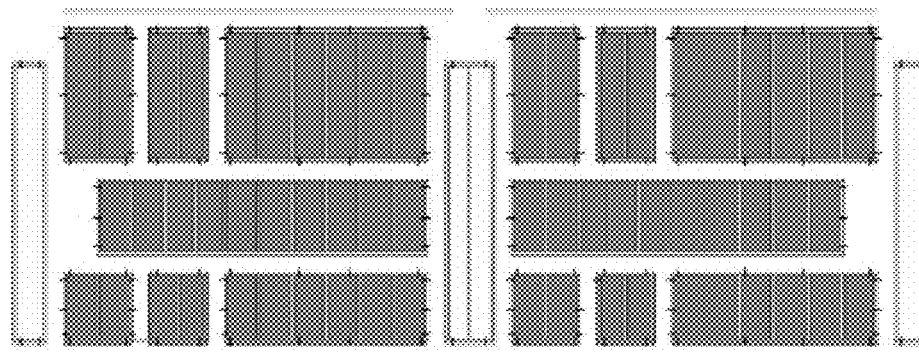
Prefabricated Form Components – Rear View
Figure 62 (Cont'd) – Form System Longitudinal Walls
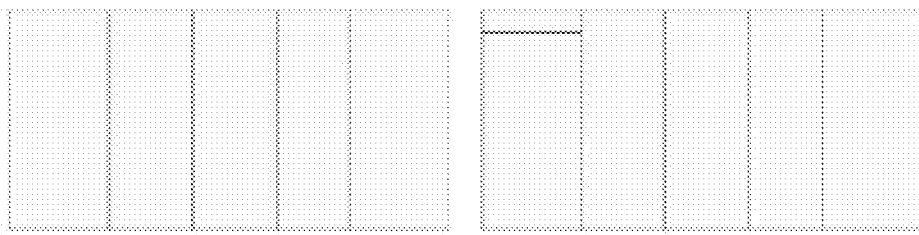
Top Deck – Top View
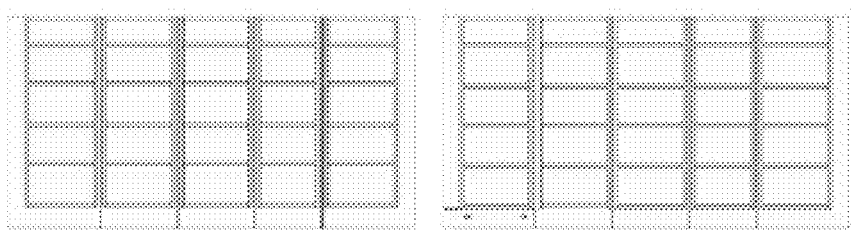
Top Deck – Bottom View (Looking Up From Below)
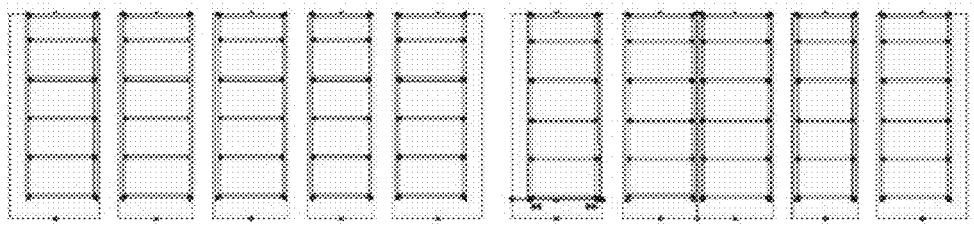
Prefabricated Components – Bottom View
FIG. 30

Door Frames In Closed Position

Door Frames In Open Position

Closed Position – Side View

Open Position – Side View

Closed Position Shown With Actuators – Isometric View

Open Position Shown With Actuators – Isometric View

Closed Position Shown With Actuators – Isometric View

Closed Position Shown With Actuators – Isometric View

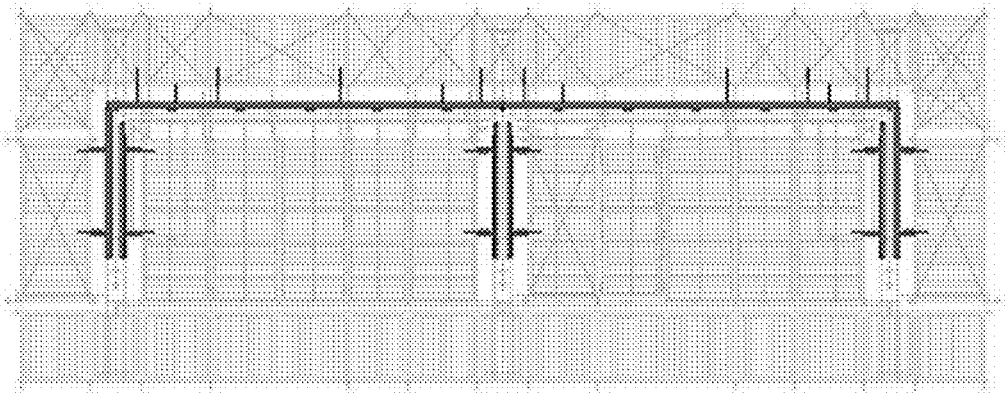
Closed Position Shown With Actuators – Top View
FIG. 40A
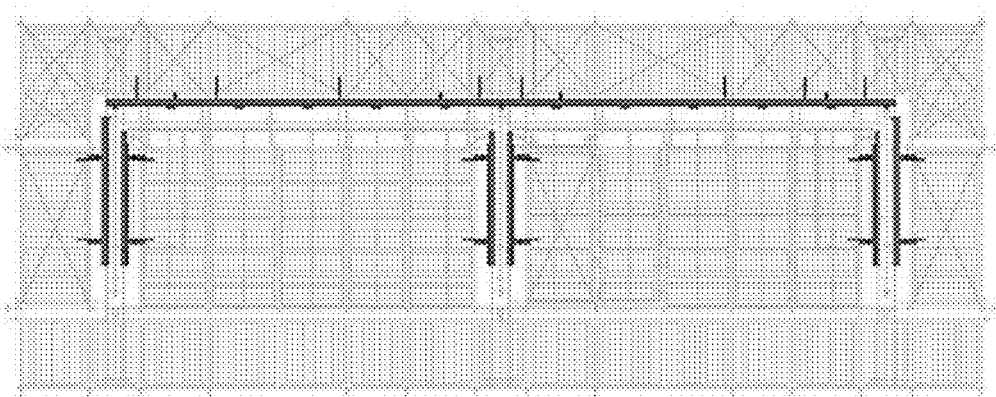
Open Position Shown With Actuators – Top View
FIG. 40B
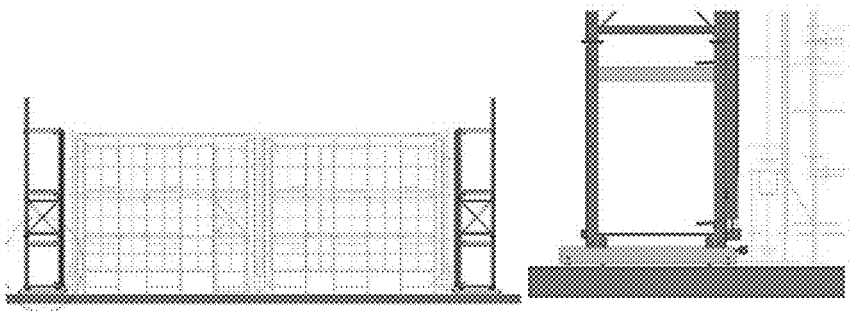
FIG. 41A
FIG. 41B Closed – Rear View Raised – Rear View Raised – Top View Closed – Top View Raised – Top View Top View    Side View
Closed Position Top View    Side View
Open Position

PORTABLE ROBOTIC CASTING OF VOLUMETRIC MODULAR BUILDING COMPONENTS

PRIORITY CLAIM/CROSS-REFERENCE TO RELATED APPLICATIONS

This document hereby claims the benefit of priority under all applicable laws, treaties and provisions to U.S. Provisional Patent Application Ser. No. 61/859,710, filed on Jul. 29, 2013, and titled "PRECAST CONCRETE MODULAR BUILDING COMPONENTS & MOBILE PRODUCTION FACTORY," the disclosure of which is expressly hereby incorporated by reference herein in its entirety.

BACKGROUND

1. Technical Field

The present disclosure relates generally to the field of manufacturing and erection of cast concrete volumetric modular building components, wherein these modules comprise both the dwelling space and the load supporting structure of a multi-story multi-dwelling building. More specifically, the present disclosure relates to portable robotic devices for manufacturing volumetric modular building components, and to configurations that facilitate erecting those modular components

2. Background Information

It is generally known to provide precast concrete volumetric modular building units that are repetitively cast at a remote manufacturing site and transported to a building site to construct a multi-story multi-dwelling building. Such prior art systems generally use conventional casting techniques, such as manually assembled and disassembled casting molds that remain at the remote manufacturing site. Such systems may be economical in certain situations, but are limited in their applications by the size and weight restrictions common to truck transportation and geographical, environmental and other considerations. Still other modules of the prior art are manufactured to provide the living space, but not the support structure. These prior art modules are generally inserted into a supporting framework at the construction site, and suffer the same negative consequences of remote fabrication.

Modular building unit configurations of the prior art are also limited with regard to their dimensional and design flexibility. As a result, the buildings that are constructed from such modules also suffer from the same limitations.

In addition, known approaches to casting such modules have negative environmental impact. For example, when the materials needed to cast the module are shipped to a remote factory, and then the completed module is then shipped to the building site, the result is an undesirable environmental impact.

Accordingly, there is a need in the art for modular building components and apparatus, systems and processes for manufacturing such components that address the aforementioned shortcomings and disadvantages.

SUMMARY

According to an aspect of the invention, a robotic casting machine (RCM) provides for on-site, or near-site casting and automated production of cast components, such as modular, volumetric building components. The RCM includes stationary and mobile support structures, which support forms with molding surfaces. The mobile support structures are adapted for movement on an RCM supporting surface relative to the stationary support structures. The support structures support forms and actuators for automated movement of molding surfaces during operation. The stationary support structures and mobile support structures cooperate such that the RCM may be configured to: 1) a loading configuration, which permits worker access to forms, molding surfaces, frameworks and other interior elements of the RCM, 2) a casting configuration, in which the molding surfaces form a contained space for receiving casting material, such as concrete; and 3) an ejection configuration in which the cast volumetric component may be ejected from the mold. Tipping machines located beneath the cast component facilitate ejection, rotation and loading of the ejected module onto a transport surface for transport of the module. An electronic control system controls actuators, which in turn control movement of the various RCM components, including forms, locking mechanisms and movement of some mobile support structures to effect automated operation.

According to an aspect of the invention, the support structures are constructed of prefabricated frames that may include at least one standardized section, which may be utilized on every project, and may also include a customized section, which may be provided to achieve desired dimensions of the cast module on a particular project. The prefabricated frames are secured with removable fasteners, such that they may be disassembled and reused on other projects. As a result, the RCM may be cost-effectively configured to provide automated, robotic casting of volumetric modules of different widths, lengths and ceiling heights, owing to the advantages provided by the RCM according to an aspect of the invention.

According to another aspect, the support structure frames are capable of being disassembled and transported in standard shipping containers. Thus, standard components may be stored in various geographic locations to reduce the cost of transport to or near any particular building site, while custom components may be transported separately, after being fabricated or manufactured at a design site or central location.

According to another aspect of the invention, a casting process is provided in which a volumetric module is cast in a rotated orientation, in which the floor is cast with an initial vertical orientation, the transverse walls extend in a horizontal orientation, which is cast in vertical wall forms, and a longitudinal wall extends horizontally along the top of the mold. This orientation proves advantageous over the prior art, including casting the entire module monolithically in one casting operation, including improved access to key areas of the molded module, including the floor and transverse walls, as well as supporting casting of modules of increased dimensions, i.e, wider and longer volumetric modules that provide wider and longer living space for occupants, while conserving space at the construction site. According to another and related aspect of the invention, after casting, the cast module is ejected from the mold using tipping machines and rotated onto a transport surface, thus avoiding the use of a crane.

According to another aspect of the invention, cast modular volumetric building components created by the RCM may have an array of configurations, including single, double and triple living units in a single building module. Moreover, an extender component may be utilized to further increase the dimensions of cast modules. Still further, owing to the advantages provided by the RCM according to an aspect of the invention, modular volumetric building components may be cost-effectively and automatically manufactured with prefabricated reinforcement assemblies in the walls with electric conduits and other infrastructure attached to the reinforcement assemblies for embedment in the module floor and walls, thus providing volumetric modular components that provide living space, as well as supporting structure for an overall building in which they are installed.

BRIEF DESCRIPTION OF THE DRAWINGS

The features and attendant advantages of the invention will be apparent from the following detailed description together with the accompanying drawings, in which like reference numerals represent like elements throughout. It will be understood that the description and embodiments are intended as illustrative examples only and are not intended to be limiting to the scope of invention, which is set forth in the claims appended hereto.

FIG. 10 is an isometric showing a cast module being transported from the RCM.

FIG. 11 is a top view of an RCM in a reloading position.

FIGS. 28-30 illustrate exemplary forms for an RCM.

FIGS. 40A and 40B illustrate closed and open position for transverse wall forms for an RCM.

FIGS. 41A and 41B illustrate exterior wall forms being moved onto a mobile B-Structure of an RCM.

DETAILED DESCRIPTION

It is useful to first describe an exemplary modular building component as background for the description of the RCM according to aspects of the invention. As will be recognized by those of ordinary skill in the art, the modular building components and the RCM described herein, as well as the related processes and systems incorporating such modular components and RCM, are regarded as aspects of the invention.

Figure 1:
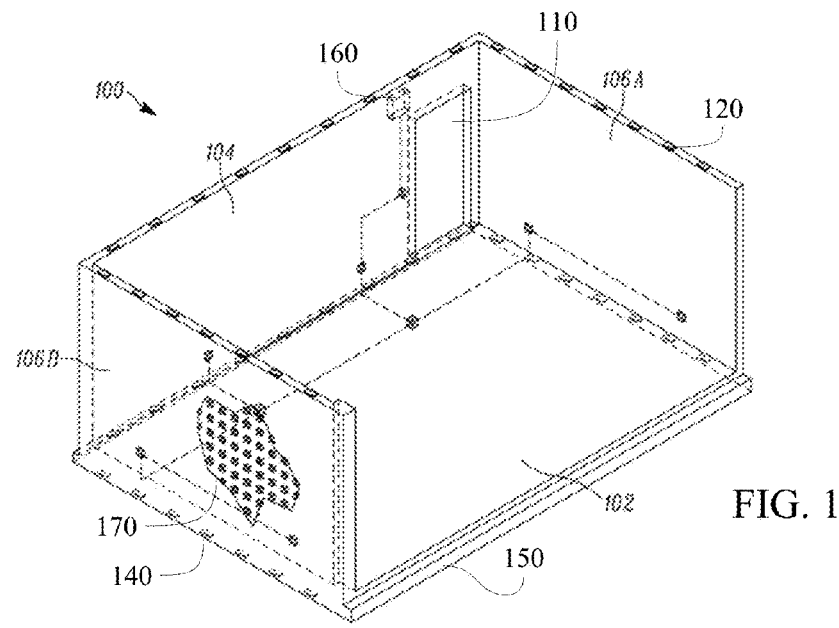
FIG. 1 is an isometric view of an exemplary building module formed by a robotic casting machine (RCM) according to an aspect of the invention.

FIG. 1 illustrates an exemplary building component module, consisting of a single dwelling unit 100. A number of such modules may be assembled to form a building structure with many such housing units. Modules 100 may include a module floor slab 102, a longitudinal wall 104, which may form an interior (i.e., hallway) wall when the module is assembled in a building. Two transverse walls 106A and 106B extend from opposite ends of the longitudinal wall 104. The floor and each of the walls may serve to demise the living space, separating it from other living spaces in the multi-dwelling building. As will be described in more detail herein, the module 100 may be one of many modules assembled in a building structure, where the ceiling for a given module may be formed from the floor slab of another module above it. In such assembled buildings, exterior walls (not shown) opposite an entry doorway 108, for example, may be added to the finished module prior to installation in the building, or as part of a larger exterior structure (i.e., a large exterior shell covering a number of modules).

Figure 2:
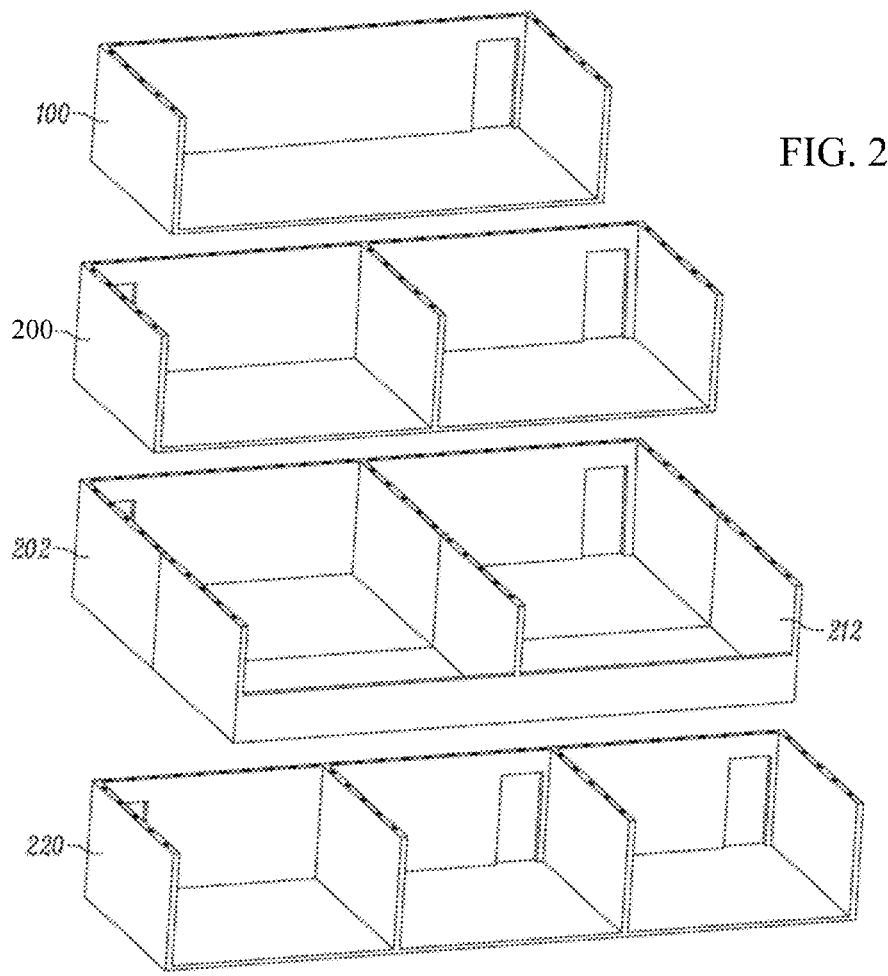
FIG. 2 illustrates isometric views of single, double and triple unit modules, and an extender module, which may be cast by a robotic casting machine (RCM) according to an aspect of the invention.

FIG. 2 illustrates different module configurations that are contemplated by the invention, and which may be cast using the RCM described herein, also contemplated by the invention. Such modules may include double-unit modules 210 or triple unit modules 220. Extender modules, such as a double unit extender module 212 may be cast using the RCM and provide for increased interior dimensions for the modules. Such extender modules 212 may be formed with an exterior wall 214 of half- or full-height. Additional details about exemplary building component modules and configurations in a building will be described following the description of the RCM according to an aspect of the invention.

Figure 3A:
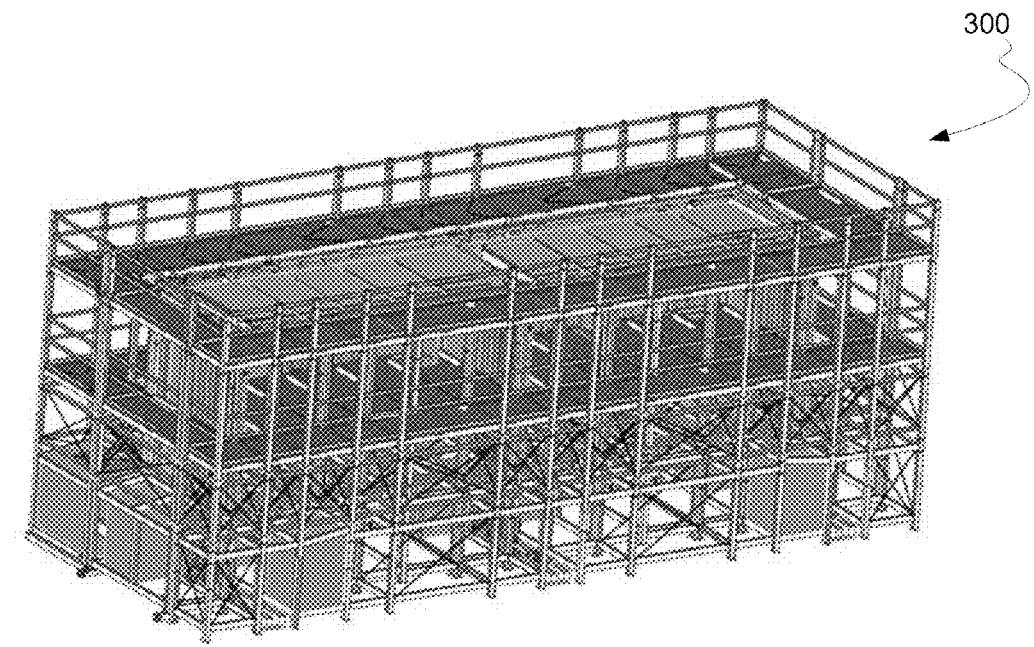
FIG. 3A is an isometric view of an exemplary RCM and FIG. 3B an isometric view showing form configurations for casting a building module such as the double unit 202 illustrated in FIG. 2.
Figure 3B:
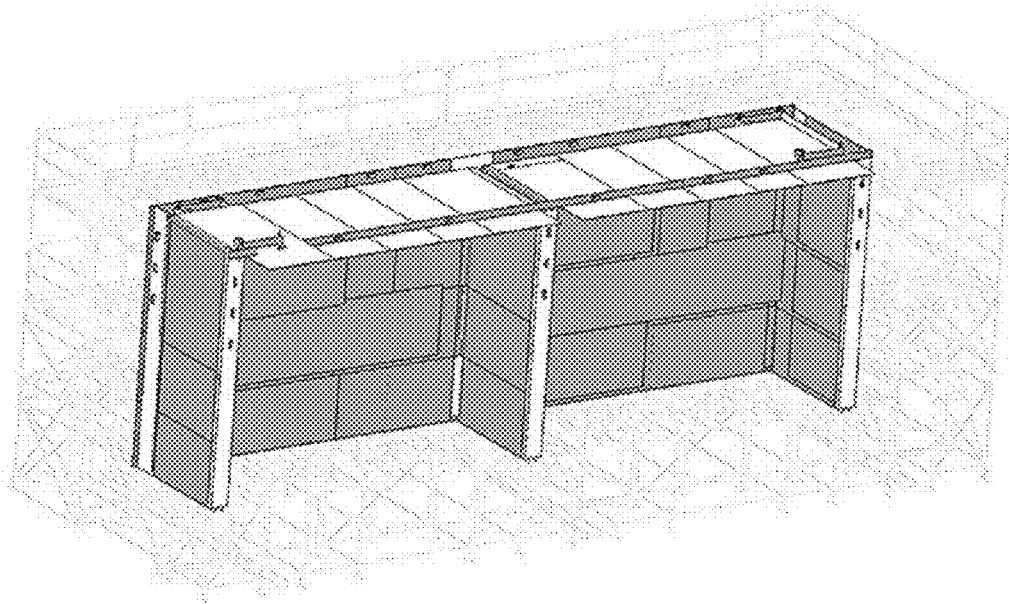

The RCM and its operation will be described generally at first, in order to illustrate the main components and operational aspects. Later in this specification, details regarding construction of the main components and other components of the RCM will be described. FIG. 3 illustrates an exemplary RCM according to an aspect of the invention, including a number of form plates 310 having molding surfaces (hidden in FIG. 3) for defining an interior space for casting modular building components. This particular described RCM is configured for a double unit module, such as that shown in FIG. 2. As will be described herein, the exemplary RCM provides for robotic movement of the form plates and molding surfaces such that modular building components may be mass produced quickly and economically. Moreover, the RCM may be assembled from a number of components and frame members that are easily transported, as will be further described herein, such that transport to, and assembly of the RCM at a production site, and mass production of modular building components can be performed economically at virtually any location. Thus, the need for remote casting of the volumetric building modules at significant distances from the building site is eliminated, and costs and risk and environmental impact factors associated with transport of the modular components over long distances are reduced.

According to an aspect of the invention, the RCM is constructed as a three-dimensional matrix of substructures, with four rows front to back that extend left to right in the longitudinal direction. These four rows are defined by substructures that include an A-Structure, a row of B-Structures, a C-Structure and a D-Structure. The A-Structure (denoted SA herein), functions to anchor the RCM to a support surface and provides access to the interior areas of the mold. The B-Structures, (denoted SB1, SB2, SB2, SB4 and SB5 herein) function to support mold form components and permit them to move as needed. The C-Structure (denoted SC) provides access to the outside of the mold and, importantly, is a mobile structure that can be moved on the support surface to open the RCM and permit loading of the RCM and ejection of molded modules from the RCM. The C-Structure may also be provided with additional horizontal bracing so it can resist the "pre-tension" forces in cases where pre-stressing of a module floor is desired for additional strength. The D-Structure (SD) is constructed of posts and beams that are located under the RCM floor forms to support the weight of the forms as well as the weight of the module floor as it is cast and cured. The Tipping Machines (TM1, TM2 and TM3) are disposed beneath the molded transverse walls and support the weight of them as the module is cast and cured.

Figure 4:
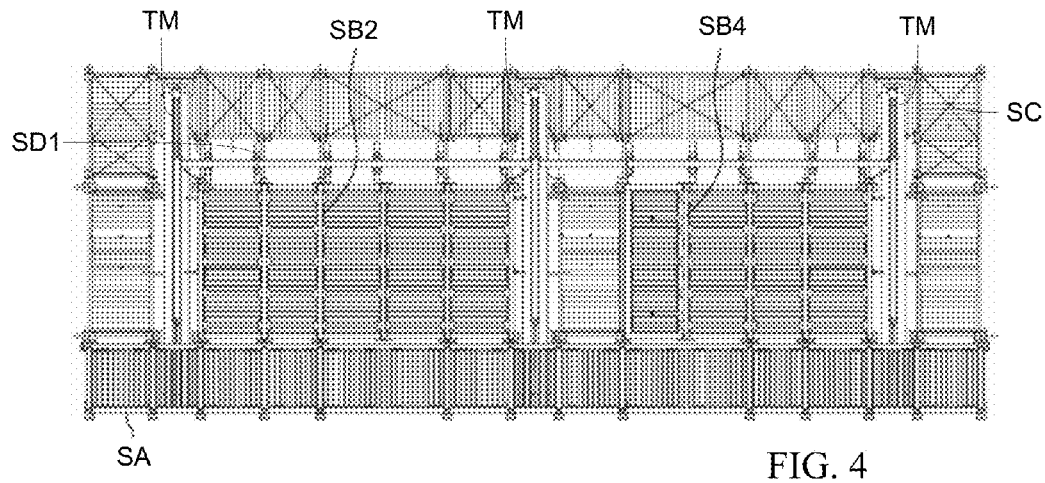
FIG. 4 is a top view of an exemplary RCM, showing a first set of stationary or anchored structural components.
Figure 5:
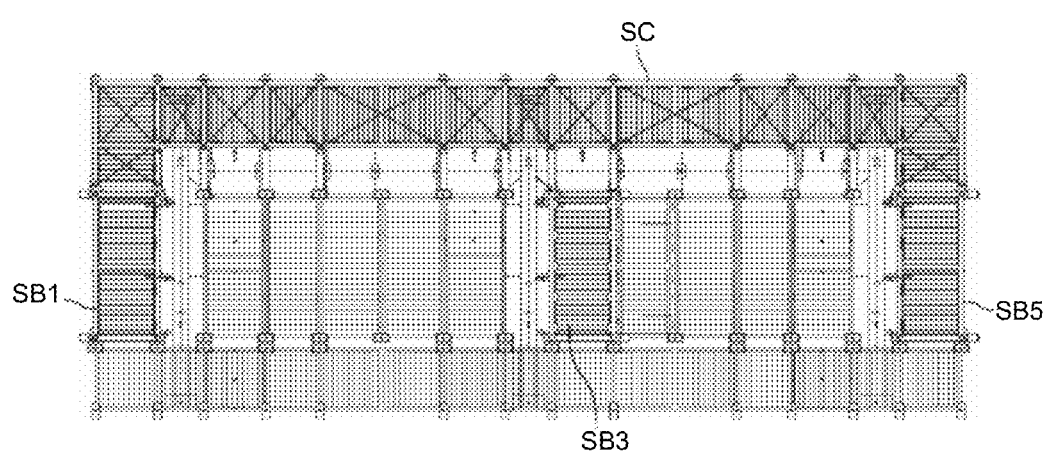
FIG. 5 is a top view of an exemplary RCM showing mobile or movable structural components.

FIGS. 4 and 5 are top views illustrating the stationary (also referred to herein as "anchored") and mobile structural components, respectively, of the RCM. The anchored structural components remain stationary during the module manufacturing process and may be bolted to a concrete slab or other RCM supporting surface, which is poured or prepared prior to assembly of the RCM. The mobile structural components are supported on the supporting surface for movement relative to the stationary structural components, using implements such as wheels, rollers or other supports that provide for movement on the level support surface. The mobile structural components move relative to the stationary structural components during the module manufacturing process to define at least three operational configurations: a casting configuration in which the form plates form a partially closed molding space; an ejection configuration which enables a cast and cured module to be ejected from the molding surfaces and tipped onto a transport; and a reloading configuration, in which the RCM provides access by personnel for cleaning, installation of any reinforcement or other pre-casting materials, and in preparation of reloading of the RCM with casting material for another module.

Generally, as will be detailed later herein, the structural components may be constructed of prefabricated steel or aluminum frame members that, when assembled, provide structural support for the form plates, actuators, catwalks and other components of the RCM. Moreover, as will be described in detail herein, the structural RCM components may be assembled from a set of frame members, which may be prefabricated and stored offsite, and shipped in a compact manner in standard shipping containers common in shipping and transportation.

The stationary RCM structural components of FIG. 4 may include a first type of structure, referred to herein as Structure "SA" and others in FIG. 4, denoted SB2, SB4, SD1 and SD2, which may be anchored to the RCM supporting surface. The Tipping Machines, denoted "TM" and shown in FIG. 4 are also anchored to the supporting surface. These structural components and Tipping Machines remain stationary relative to the RCM support surface during the module manufacturing process and operation of the RCM.

The mobile structural components of FIG. 5 include a first group of mobile structures, referred to herein as SB1, SB3 and SB5, and a second type of mobile structure, SC.

Figure 6:
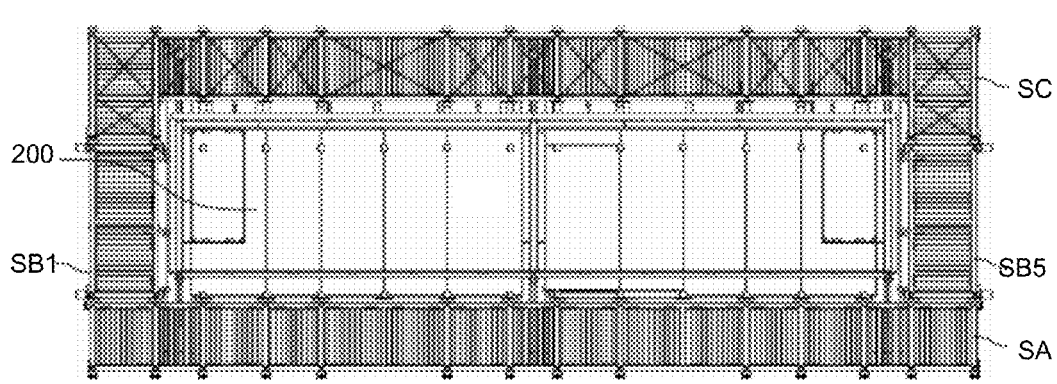
FIG. 6 is a top view of an exemplary RCM showing the structural components in a casting configuration

FIG. 6 depicts the RCM in a casting configuration. In the FIG. 6 casting configuration, the A, B and C structures are in the positions shown in FIGS. 4 and 5. Deck forming surfaces, which provide molding surfaces for the longitudinal wall cast as a top deck of the mold, block the view of the underlying B-structures, SB2, SB3 and SB4. In accordance with an aspect of the invention, this particular casting orientation of the module—casting the longitudinal wall as a top deck of the mold, and the floor in vertical orientation in the mold—provides advantages that will be apparent from the description that follows.

Figure 7:
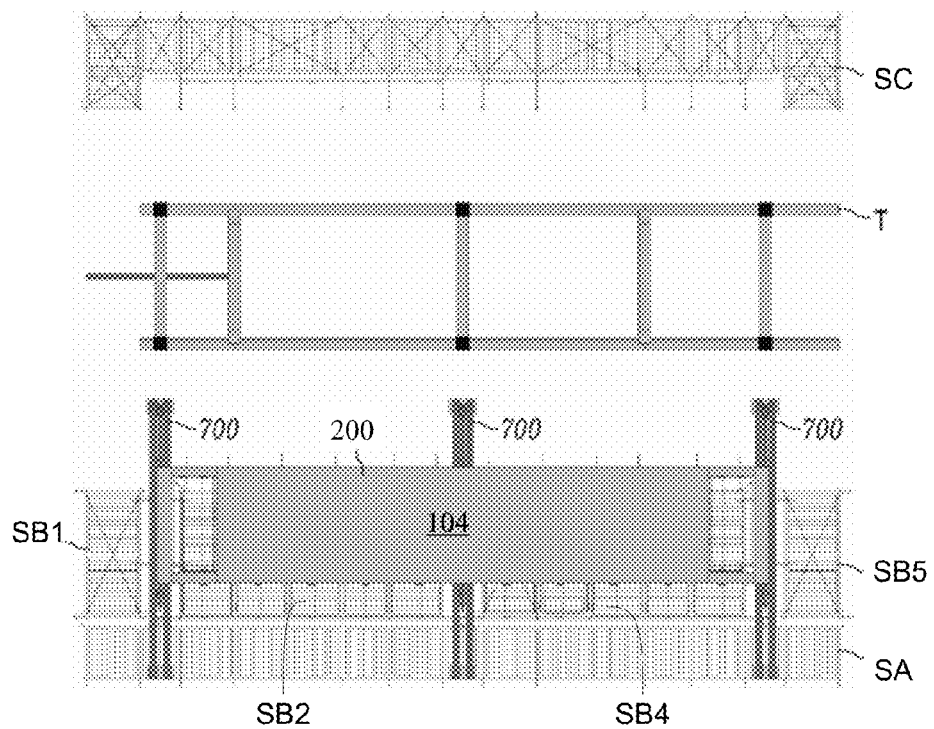
FIG. 7 is a top view showing RCM components in a module ejection configuration.

In the FIG. 7 ejection configuration, the SC structural component has moved away from the stationary SA structure (and Stationary SB structures, hidden from view in FIG. 7) and the cast module 100 rests on tipping machines 700 to be ejected and tipped onto a transport "T."

Figure 8:
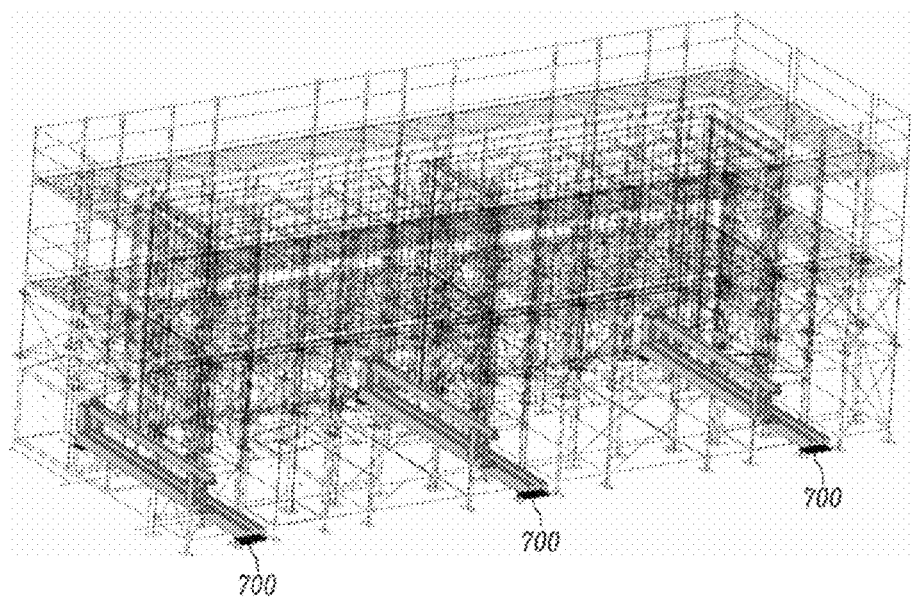
FIG. 8 is an isometric view of an RCM showing tipping machines (TM).

FIG. 8 illustrates the orientation and structure of tipping machines 700. The tipping machines are generally situated underneath the module transverse walls and support the weight of the concrete during casting of the module. FIG. 8 illustrates the RCM in a closed configuration, for purposes of illustrating the tipping machine locations. When the tipping machines eject a cast module, the RCM is in the open configuration shown in FIG. 7.

FIGS. 9A-9H illustrate details of an ejection process and operation of tipping machines for the RCM. Tipping machines 700 may include two base members 702, referred to as the tipping base, one on each side of the machine centerline. The tipping base members extend horizontally and are stationary with regard to the RCM support surface 10. The tipping machine also may include a single tipping arm 706 located above and between the tipping base members with a horizontal orientation during the casting process. The tipping base and tipping arm are joined by a vertical member 704 located between the base members and centered under the tipping arm. Member 704 is rigidly connected to the end of the base members and connected to the end the tipping arm thru a hinge located at the top of 704 and at the end of 706. The hinge allows only a rotational movement of the tipping arm about the center axis of the hinge. During the ejection process, the tipping machine actuators force the tipping arm to rotate, and that, in turn, forces the module to rotate. Before the tipping process is begun, a cable 710 may be fastened to the module 200 using an embedded eye bolt or the like and passes over a pulley 712 to a motorized tensioning system to keep the module 200 supported against the tipping arm as pivoting proceeds. The initial thrust that begins the rotation of the tipping arm (and the module) is provided by the vertical actuator 720 that is centered between the tipping base members and under the tipping arm. As that actuator reaches its full extension, a second actuator 730 located between the tipping base members begins its extension pushing against another member 708 that is rigidly connected to the bottom of the tipping arm. In the casting position, 708 provides vertical support for the end of the tipping arm by resting on the RCM base. During rotation of the tipping arm and the module, 708 provides the leverage, which combined with the push from the large actuator 730, continues the rotation of the tipping arm and the module until the module reaches the balance point at the top of the rotation. At that point, the weight of the module provides the remaining leverage for the rotation, and the cable system in concert with the tipping arm, the member 708 and the actuator 730, all work to provide restraint to control the movement of the module. Also, once the module reaches the balance point, another actuator 740 begins to retract to allow the module to slide downward on top of the tipping arm surface until the module is lowered onto the transport bearing surfaces. At that point, the cables are released, and the transport moves away with the module while the tipping machine is retracted back to its closed orientation.

Figure 9:
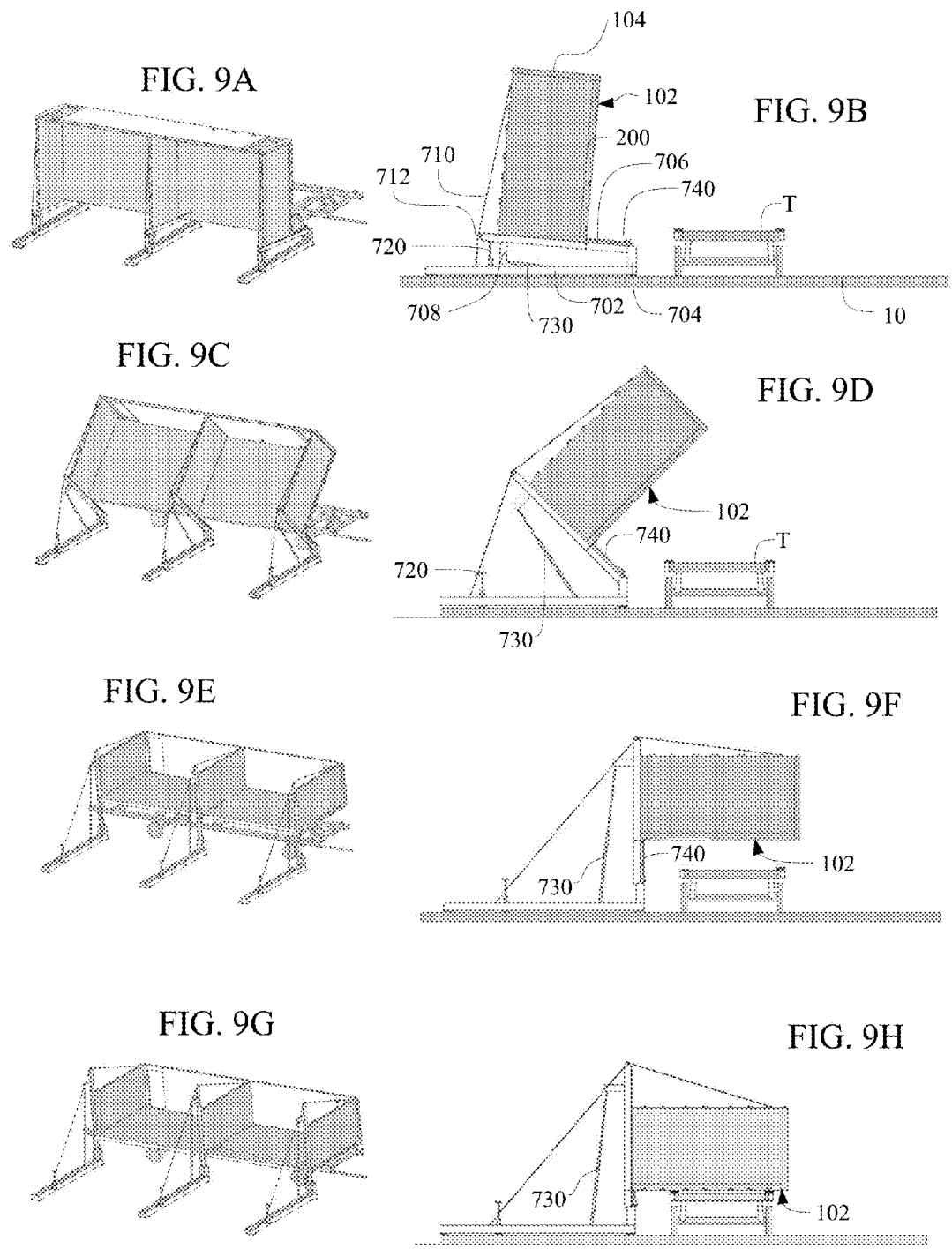
FIGS. 9A-9H are views showing ejection and loading of a cast module onto a waiting transport.
Figure 12A:
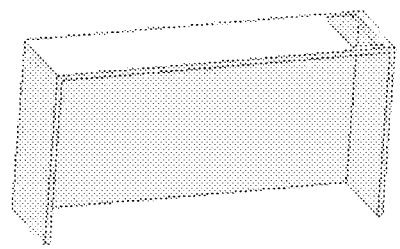
FIG. 12A-12D are isometric views of a casting orientation of a single unit, double unit, extender module and triple unit module.
Figure 12B:
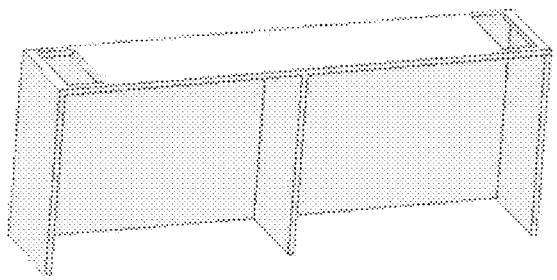
Figure 12C:
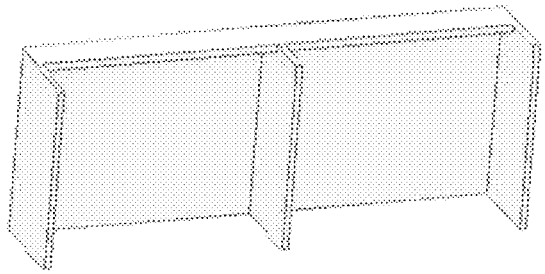
Figure 12D:
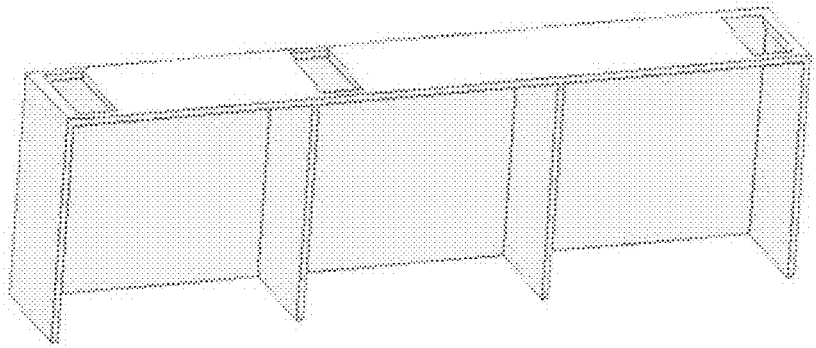
Figure 66:
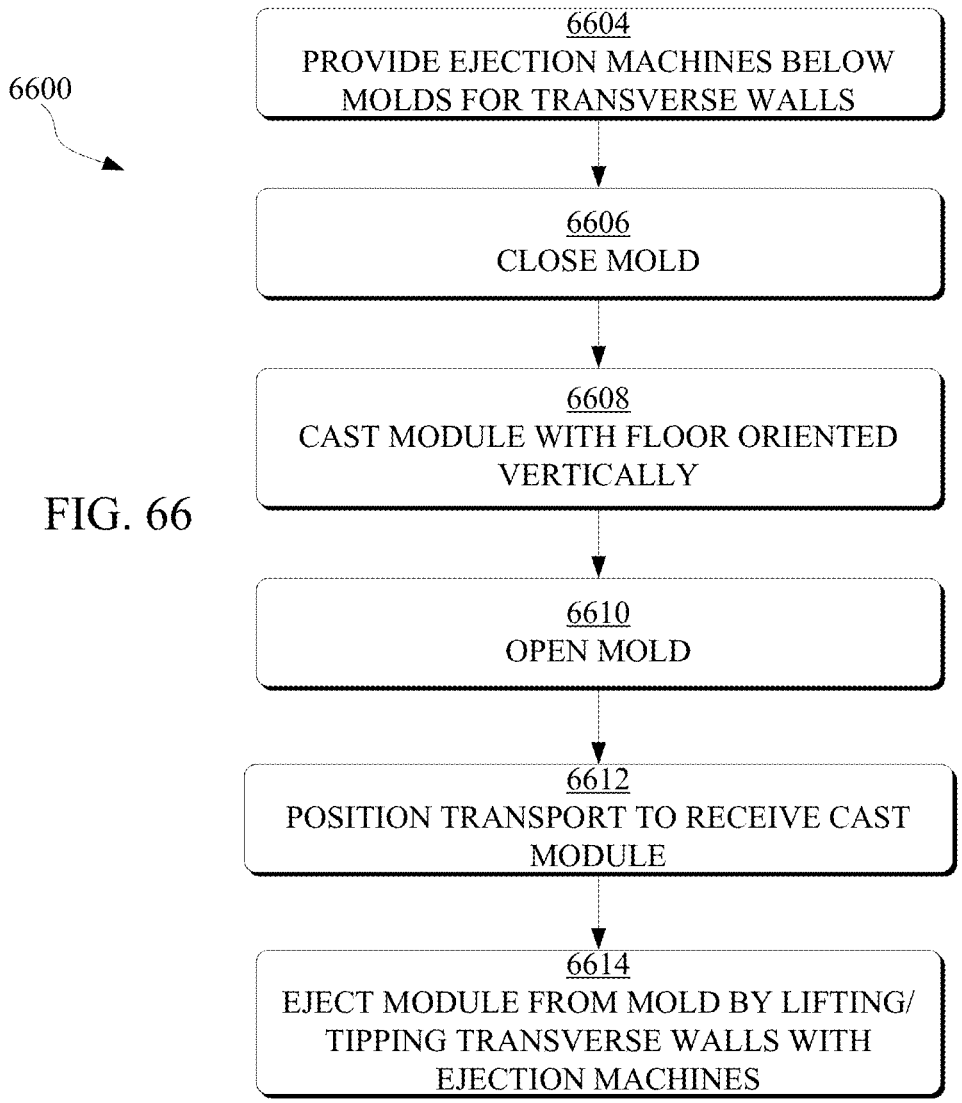
FIG. 66 illustrates a casting process according to an aspect of the invention.

In FIGS. 9A and 9B, the module 200 is in a position that is slightly rotated upward (clockwise relative to FIG. 9B) from the casting position, as actuator 720 provides initial upward movement of the end of tipping arm 706 and corresponding rotation of the module 200. FIGS. 9C and 9D illustrate the tipping process at an intermediate position in which the tipping arm 706 is rotated clockwise under power from actuator 730 acting on support leg 708. FIGS. 9E and 9F show the module ready to be lowered by the cable and actuator 740. FIGS. 9G and 9H show the tipping arm 706 rotated to a 90-degree position from the horizontal with the module 200 rotated to a position in which floor 102 rests on the transport T. FIG. 66 illustrates a process for casting and ejecting a module as described above.

FIG. 10 is an isometric view of a transport T moving a loaded module 100 after tipping is complete. RCM is in a reloading configuration.

FIG. 11 depicts the reloading configuration of the RCM where Mobile B-Structures SB are moved outward away from the tipping machines 700 creating a space between the stationary B-Structures and the mobile B-Structures for personnel to access additional areas of the RCM.

FIGS. 12A-12D illustrate the casting orientation of various modules that may be cast using an RCM according to an aspect of the invention. As will be recognized by those of ordinary skill, the RCM provides for casting of the volumetric modular building components in an orientation in which the floor and transverse walls are cast in a generally vertical orientation and the longitudinal wall is cast in a generally horizontal orientation and as a topmost element of the casting mold. This orientation offers the advantage of allowing the RCM to operate robotically and enables newly cast modules to be ejected from the mold and moved about at the building site without the use of a crane. The orientation also offers the advantage of minimization of the stresses in the new module casting material during ejection from the RCM, which in turn, may permit reduced cure time. That is, the module may reach sufficient structural strength to withstand the ejection-caused stresses sooner than prior art devices. Yet another advantage is that this orientation allows the casting of the exposed longitudinal wall surfaces on the top deck of the RCM, which enables the application of various finishes to the exposed wall surfaces if desired by the architect.

An exemplary set of RCM structural components for providing structural support to the RCM forms and actuators, and for supporting catwalks and other working surfaces and other components, may include four general types of structural component structures, which will be denoted A-Structures; B-Structures; C-Structures and D-structures. An exemplary set of components may include one A-Structure; five B-structures; one C-Structure; and two D-Structures. The exemplary RCM may include a form system and actuators, as will be further detailed below.

According to an aspect of the invention, the A-Structure, B-Structures and C-Structure may each be shipped as subassemblies that may be fastened (i.e., bolted) together at the building site. Each of the A-Structure, B-Structure and C-Structure is composed of 1) primary vertical frames; 2) secondary vertical frames; 3) catwalk inserts; 4) actuators; and 5) in some cases additional bracing.

Exemplary embodiments of the A-Structure, B-Structure and C-Structure will be described. While particular details of prefabricated frames used to construct these structures are explained below, it should be recognized by those of ordinary skill in the art that other components may be used without departing from the spirit and scope of the invention. For example, different primary and secondary frames may be used to construct the A-structure, incorporating different materials or tubing configurations. What is important is that the frame members are capable of disassembly and easy transport, include a custom section and standard section(s) and when assembled, provide strength, rigidity and dimensional accuracy as well as to provide for the support of worker platforms and operation of the other components of the RCM as described here.

Figure 13:
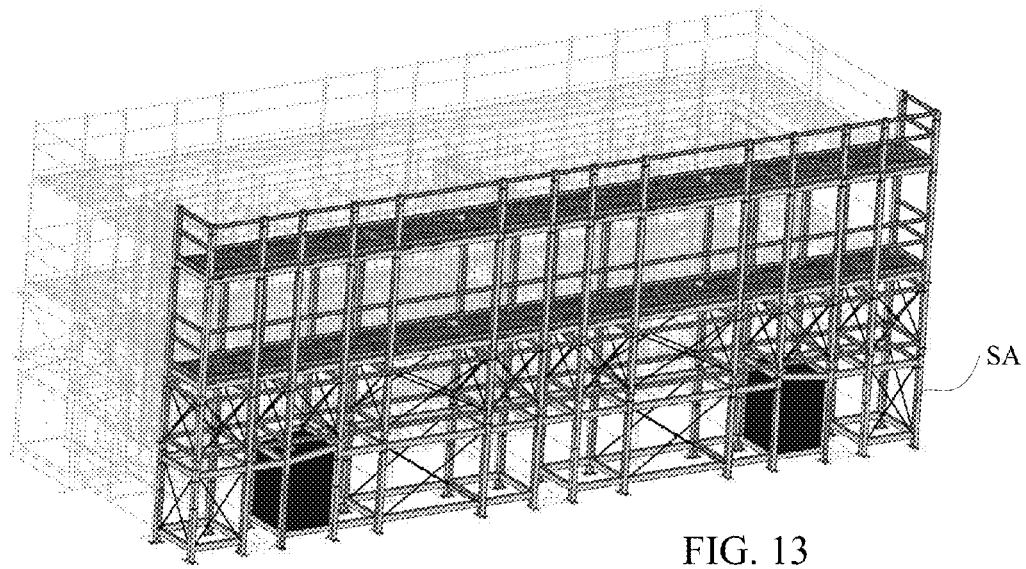
FIG. 13 is an isometric of an A-Structure of an RCM according to an aspect of the invention.
Figure 14A:
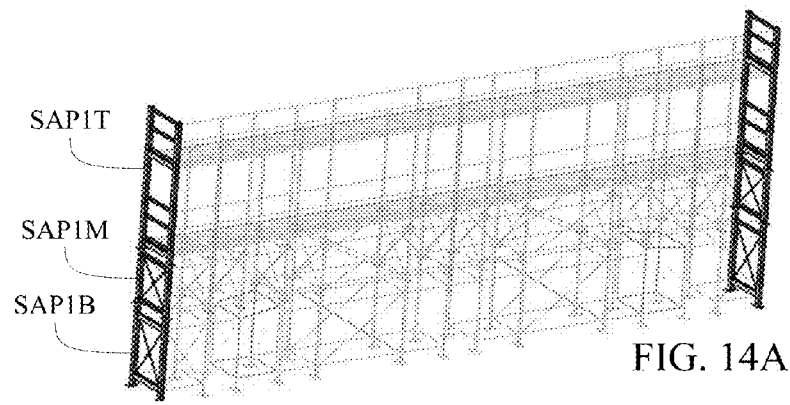
FIGS. 14A-14D are isometrics of exemplary A-Structure primary frames.
Figure 14B:
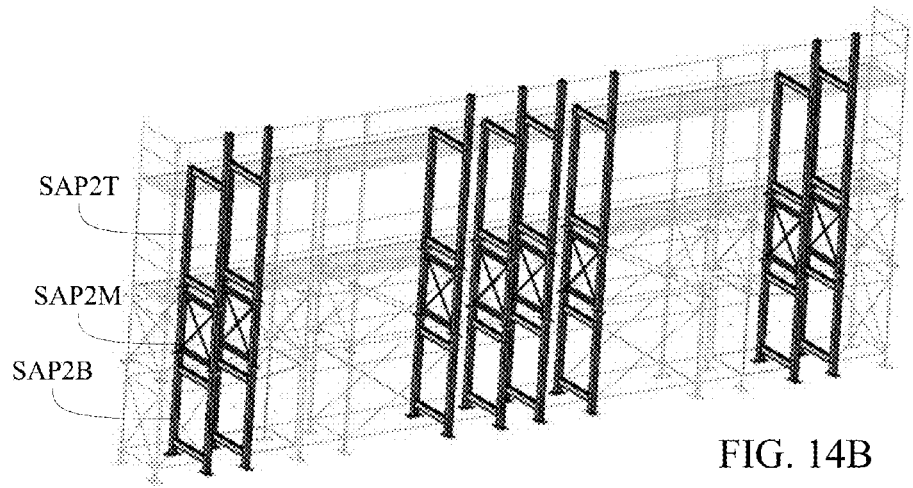
Figure 14C:
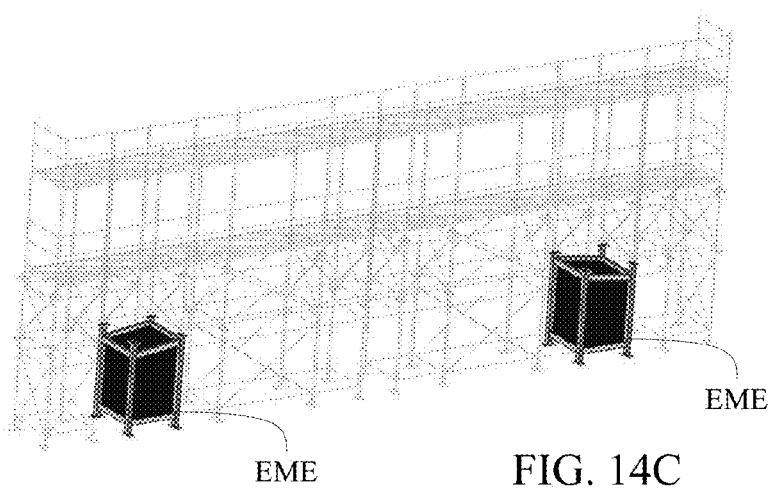
Figure 14D:
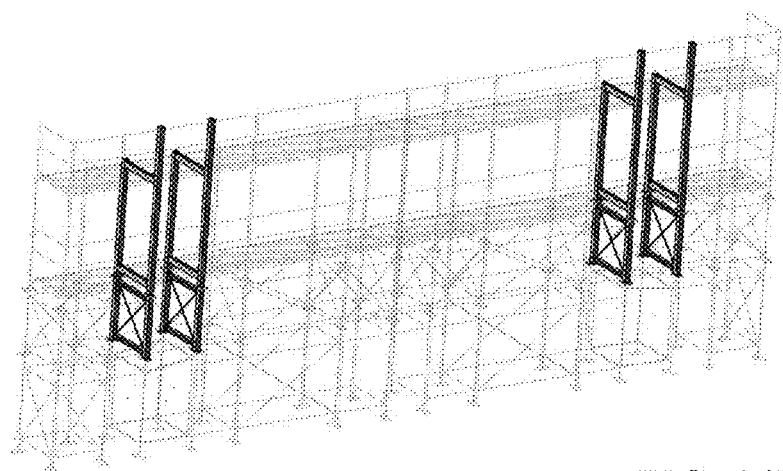

FIG. 13 illustrates an assembled A-structure. The A-Structure is generally stationary. That is, it is anchored to the support surface and does not move. The exemplary A-Structure may include a number of frame sections, such as four types of primary frames illustrated in FIGS. 14A-14D. The primary frames may include an electromechanical enclosure (EME) incorporated into the frame, for safely enclosing particular equipment of the RCM. Such equipment may include digital and radio control panels and systems, hydraulic pumps and fluid containers for the actuators of the RCM (described below), electric power control circuits and other sensitive equipment that requires protection from contamination likely to occur from the RCM cleaning and/or operations.

These primary frames are secured to the RCM support surface with appropriate connectors at their base. FIGS. 15A-15J illustrate exemplary secondary frames for the A-Structure. Secondary frames are secured to the primary frames, which are in turn secured to the support surface. As will be recognized by those of ordinary skill in the art, the Figures depicting the primary and secondary frames for the A-structure, as well as the illustrations for other structures that follow, also illustrate an assembly process for the exemplary structures. Generally, the secondary frames are provided with "L" shaped (in cross-section) vertically extending posts (vertical angles). This structure of the secondary frames provides unique advantages in permitting the secondary frames to be fastened to the primary frames in a quick and safe manner.

In accordance with an aspect of the invention, the primary and secondary frames are provided with multi-sectional structure, which enable the RCM to be transported efficiently, and enable the RCM to be configured for various dimensional changes without requiring complete re-fabrication of the subassemblies. For example, the middle section SAP1M of the first type A-Structure Primary Frame SAP1 and middle section SAP2M of the second type A-Structure Primary Frame may be fabricated at longer lengths to achieve a wider cast volumetric modular component while the other sections SAP1B and AP1T, as well as SAP2B and SAP2T may be standard components used in every deployment of the RCM. Thus, the base and top sections may be standard members, reused for every RCM deployment, and the middle sections AP1M, AP2M, and other middle sections of the frame members described below may be customized to achieve a given width of a cast modular volumetric component.

Figure 16:
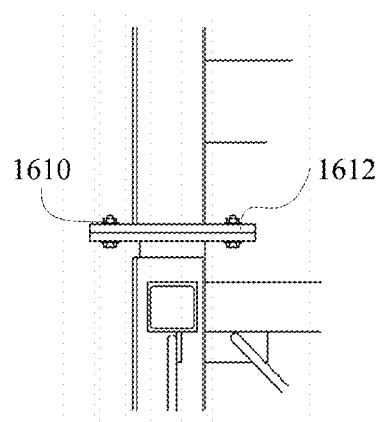
FIG. 16 illustrates an exemplary fastener for connecting primary frames.
Figure 17:
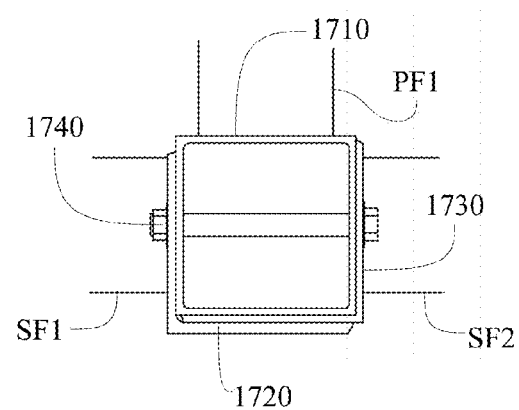
FIG. 17 illustrates an exemplary fastener or connecting secondary frames to a primary frame.

According to an aspect of the invention, the primary and secondary frame members may be joined together with fasteners that provide for efficient and quick assembly while providing strong structural support. FIGS. 16 and 17 depict fastening configurations according to an aspect of the invention. FIG. 16 illustrates a fastener for connecting bottom, middle and top sections of primary frames. Such a connector may include respective cap plate members welded to the square steel tubing of which the primary frames may be constructed. Flange members 1610 and 1612 may be secured together with threaded fasteners 2014.

Figure 15A:
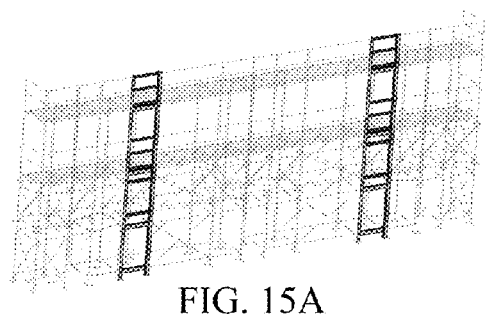
FIGS. 15A-15J are exemplary A-Structure secondary frames.
Figure 15E:
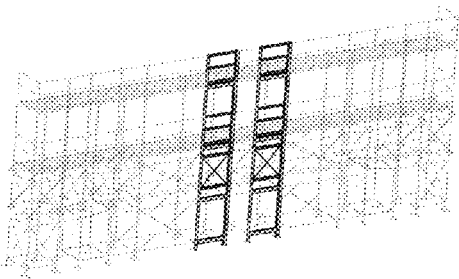
Figure 15B:
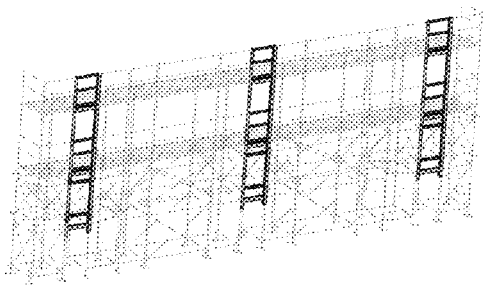
Figure 15F:
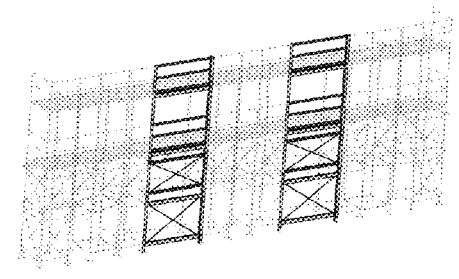
Figure 15C:
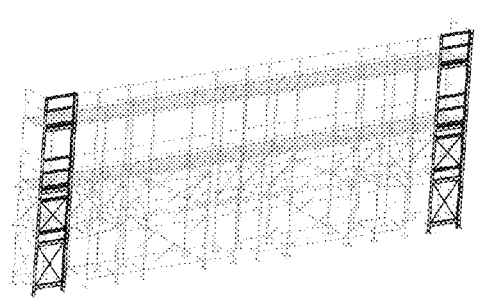
Figure 15G:
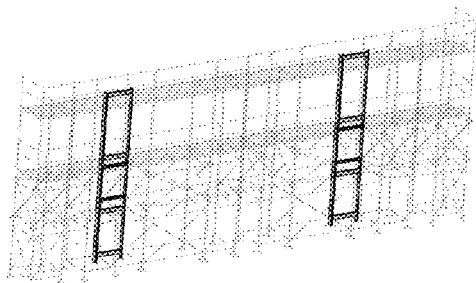
Figure 15D:
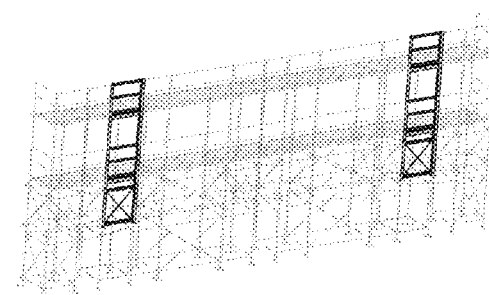
Figure 15H:
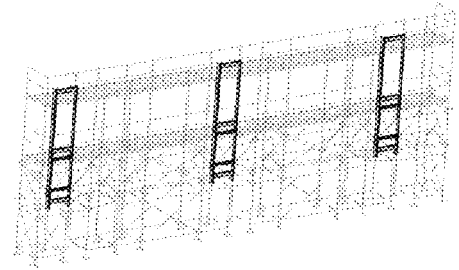
Figure 15I:
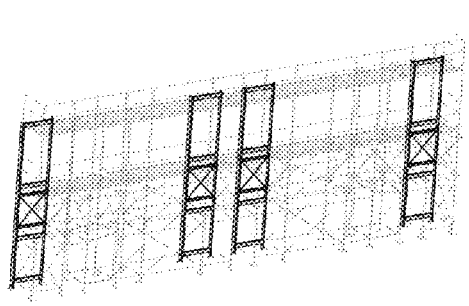
Figure 15J:
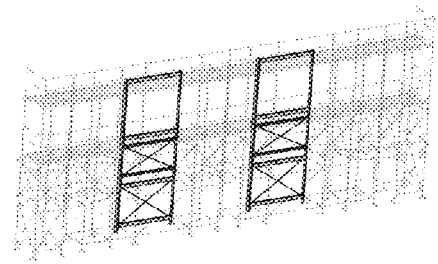
Figure 15K:
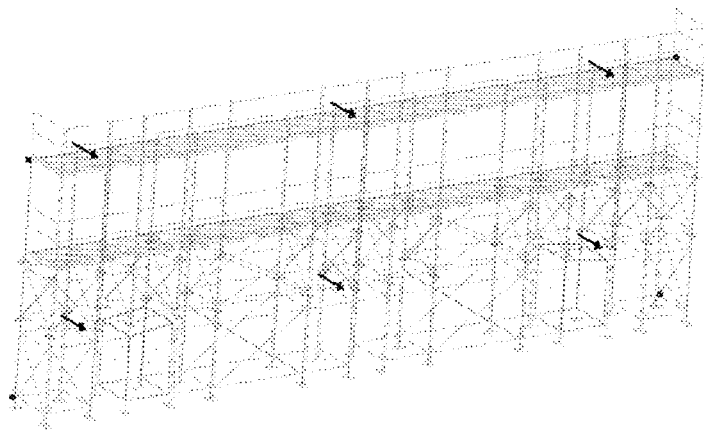
FIG. 15K illustrates actuator positions on an exemplary A-Structure.
Figure 15L:
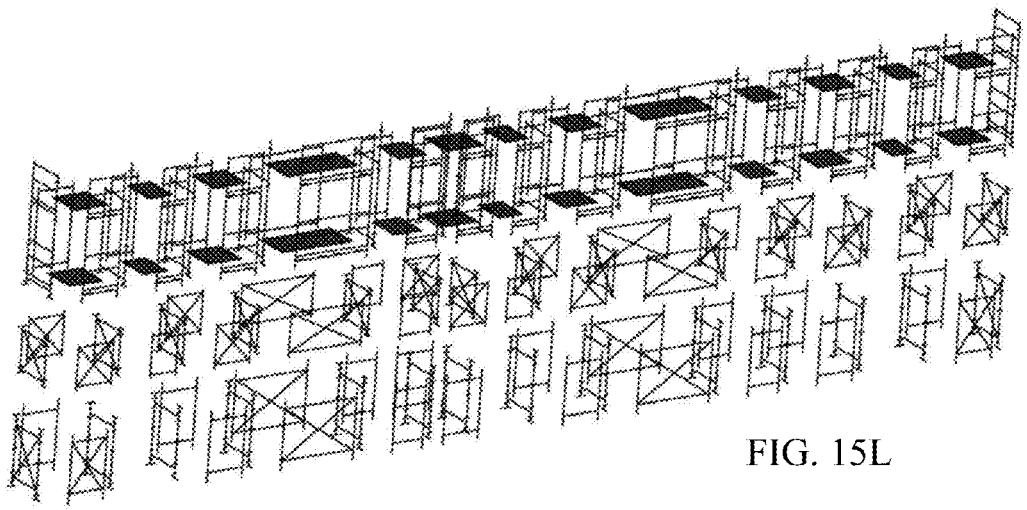
FIG. 15L is an assembly drawing of an exemplary A-Structure.
Figure 18:
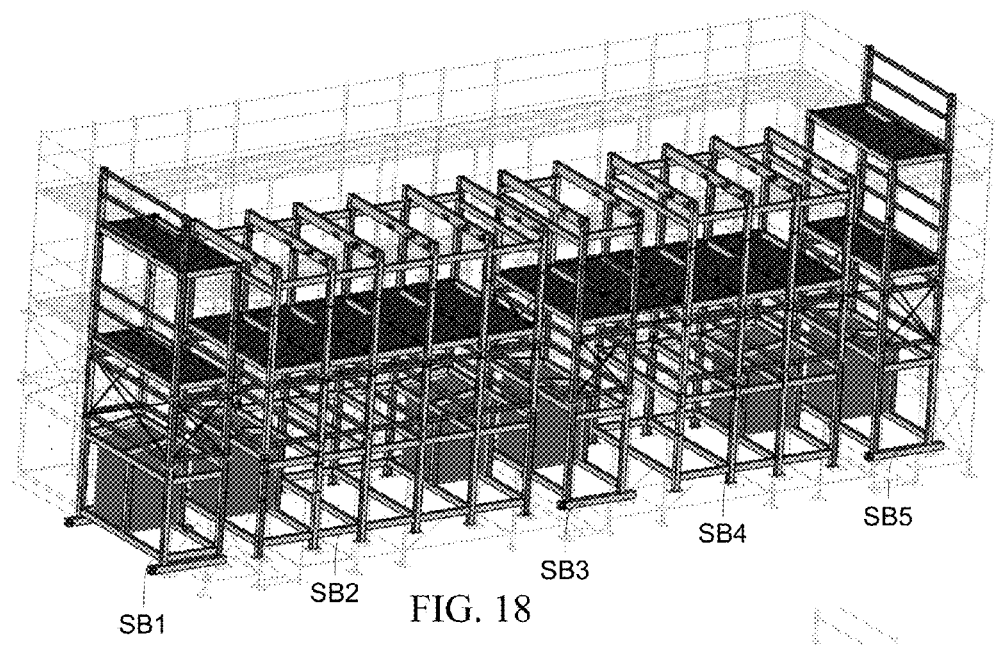
FIG. 18 is an isometric of an exemplary B-Structure.

FIG. 17 is a top, cross-sectional view illustrating an exemplary fastening technique for fastening two secondary frames, SF1 and SF2, to a primary frame, PF1. Primary frame PF1 has a vertically extending square tube 1710, shown in cross-section. Secondary frame SF1 has a vertically extending "L" shaped channel 1720. Similarly, secondary frame SF2 has a vertically extending "L" shaped channel 1730. A threaded fastener 1740 extends through holes in the square tube 1710 and respective vertically extending "L" shaped channels 1720 and 1730 to secure the two secondary frames SF1 and SF2 to the primary frame PF. This configuration allows the secondary frames to be secured to the primary frames in a quick and efficient manner. FIG. 15K illustrates the position of actuators on the A-Structure. FIG. 15L is an exploded assembly drawing of an exemplary A-structure.

B-Structure

The B-Structure subassemblies will be described with reference to FIGS. 18-22. Like the A-Structure, the B-Structure functions to support platforms, such as catwalks, to allow workers to access areas of the RCM. The B-Structure is a framework that defines areas for supporting forms with molding surfaces for the transverse walls and longitudinal wall. The B-Structure also defines recesses where the tipping machines can be accommodated. According to an aspect of the invention, the B-Structure has both stationary and mobile components. Stationary components are designated SB2 and SB4 in FIG. 18, whereas mobile components are designated SB1, SB3 and SB5. The mobile components SB1, SB3 and SB5 are supported on wheels to enable movement.

Figure 19A:
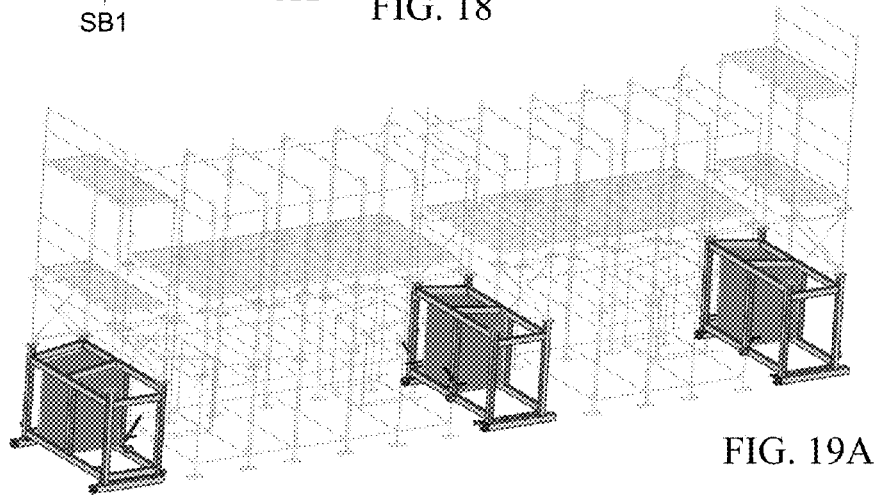
FIGS. 19A-19C illustrate B-Structure primary frames.
Figure 19B:
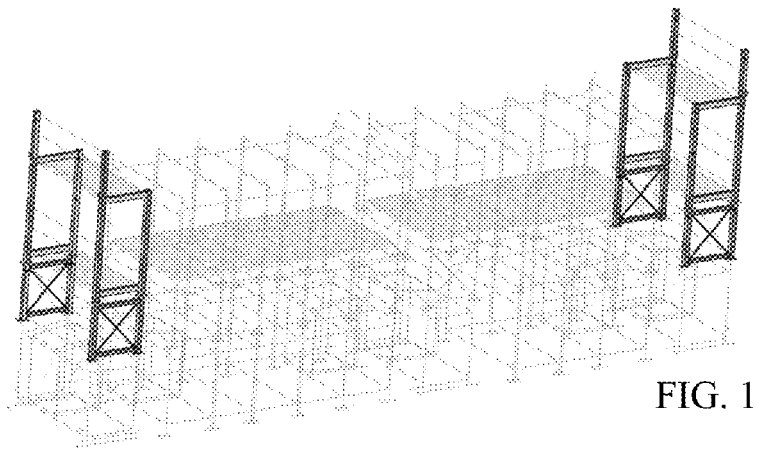
Figure 19C:
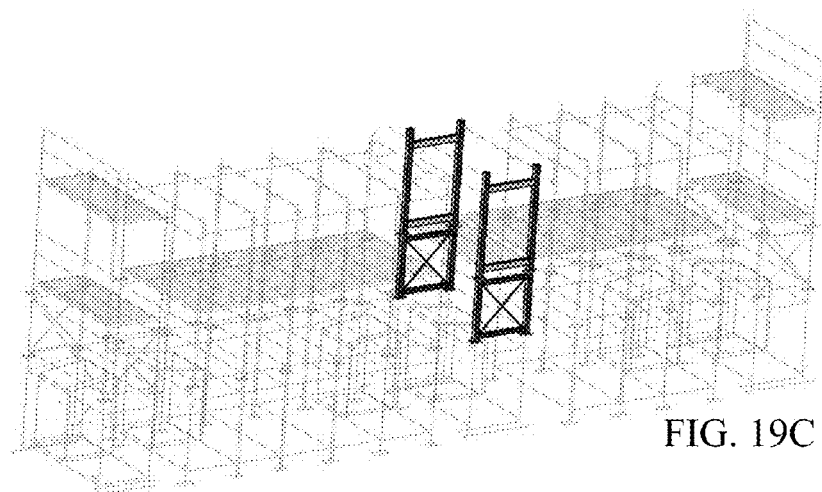
Figure 20A:
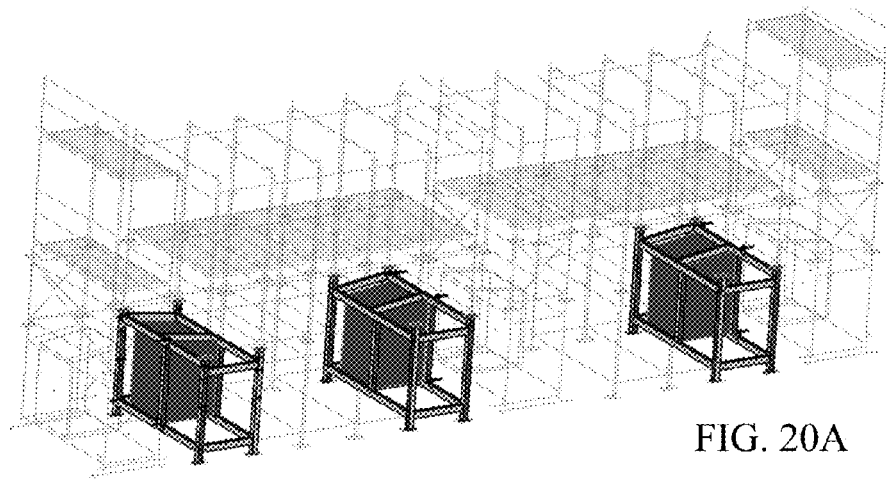
FIGS. 20A-20E illustrate B-Structure primary frames.
Figure 20B:
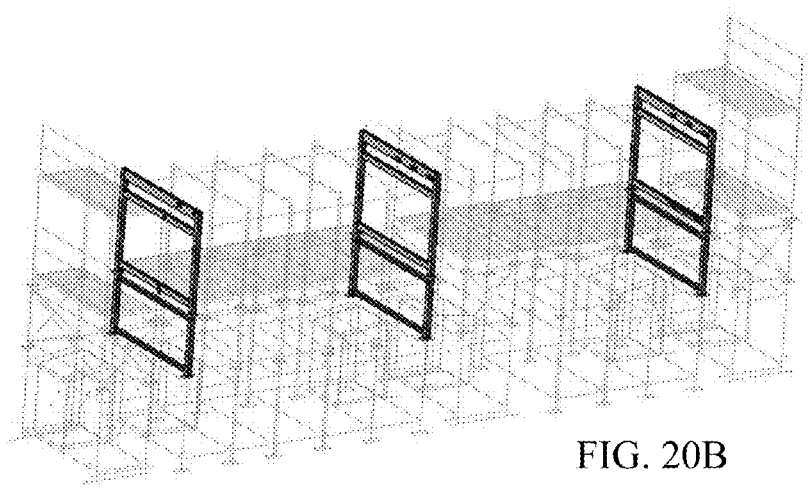
Figure 20C:
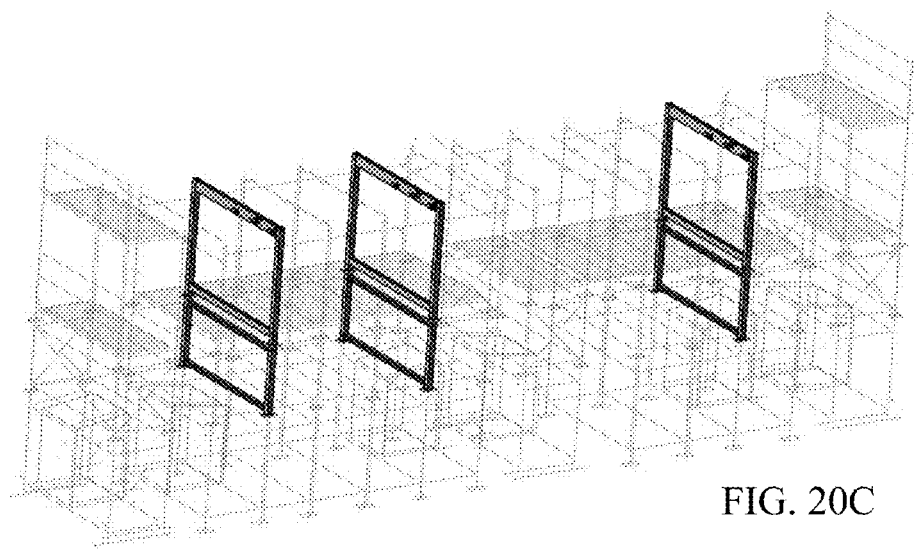
Figure 20D:
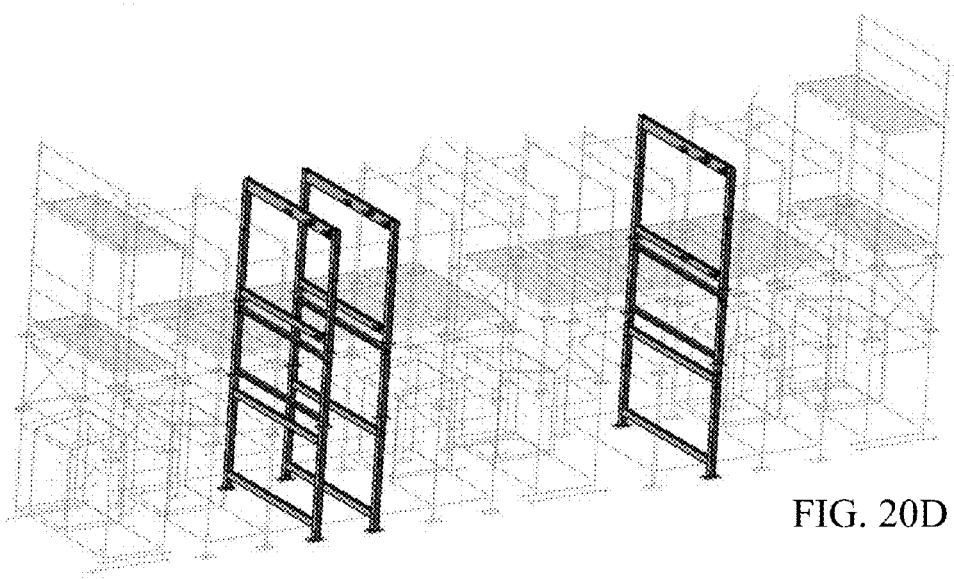
Figure 20E:
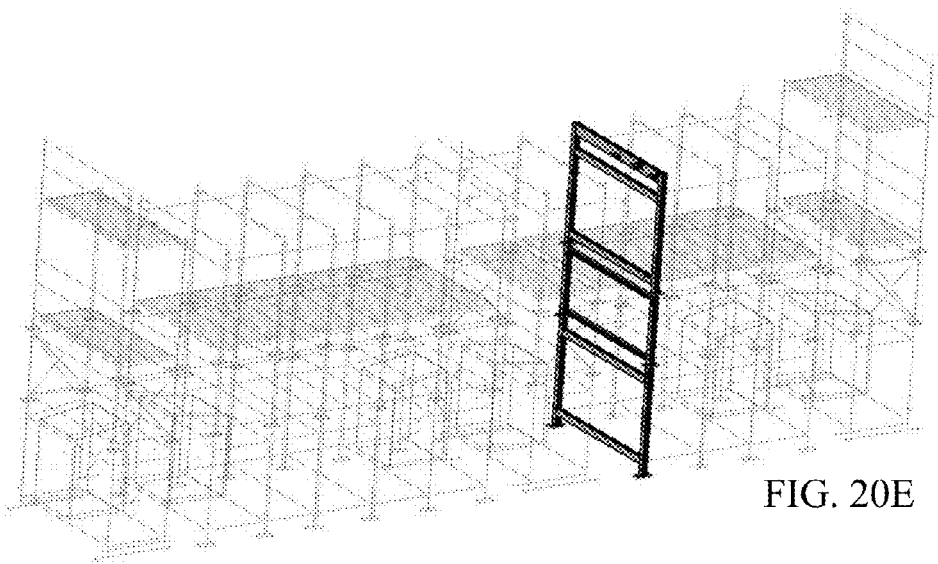
Figure 21A:
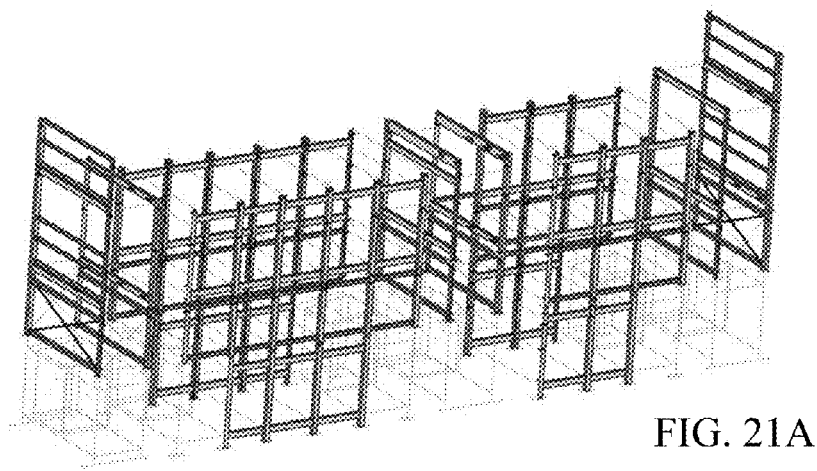
FIGS. 21A-21I illustrate exemplary B-Structure secondary frames.
Figure 21B:
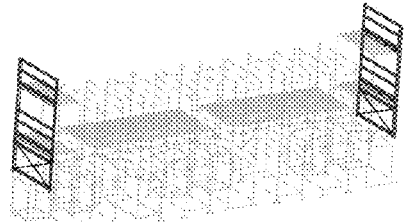
Figure 21C:
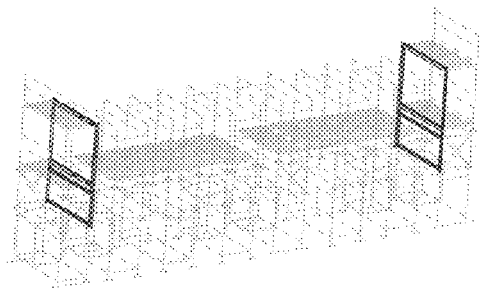
Figure 21D:
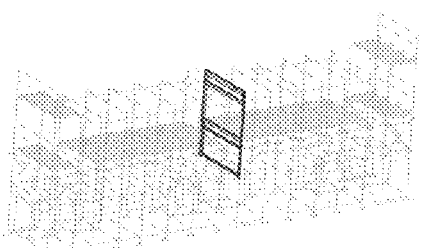
Figure 21E:
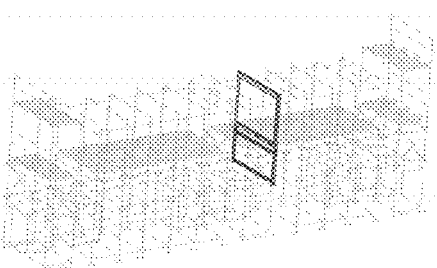
Figure 21F:
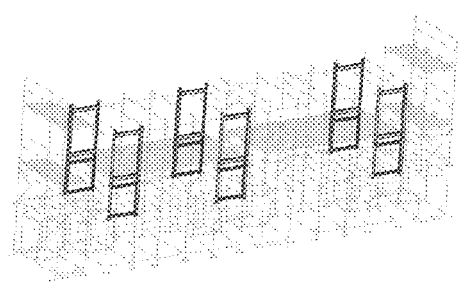
Figure 21G:
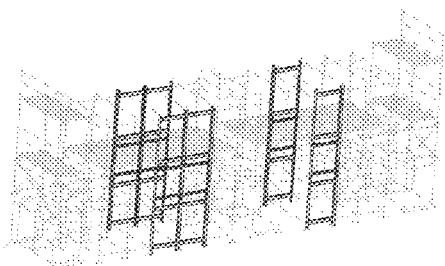
Figure 21H:
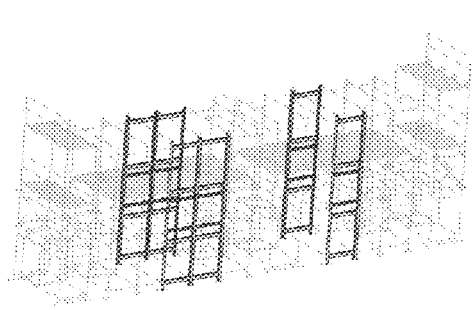
Figure 21I:
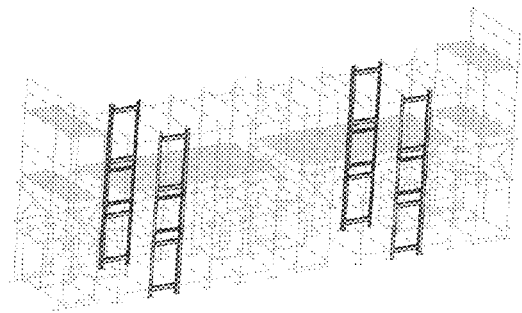
Figure 22:
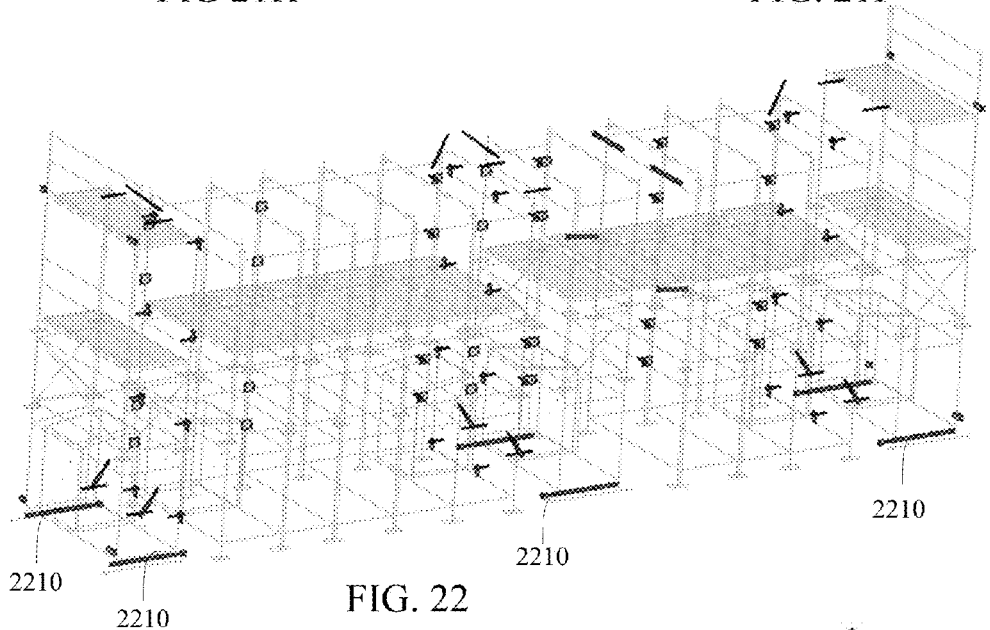
FIG. 22 illustrates actuator positions on an exemplary B-Structure.
Figure 23A:
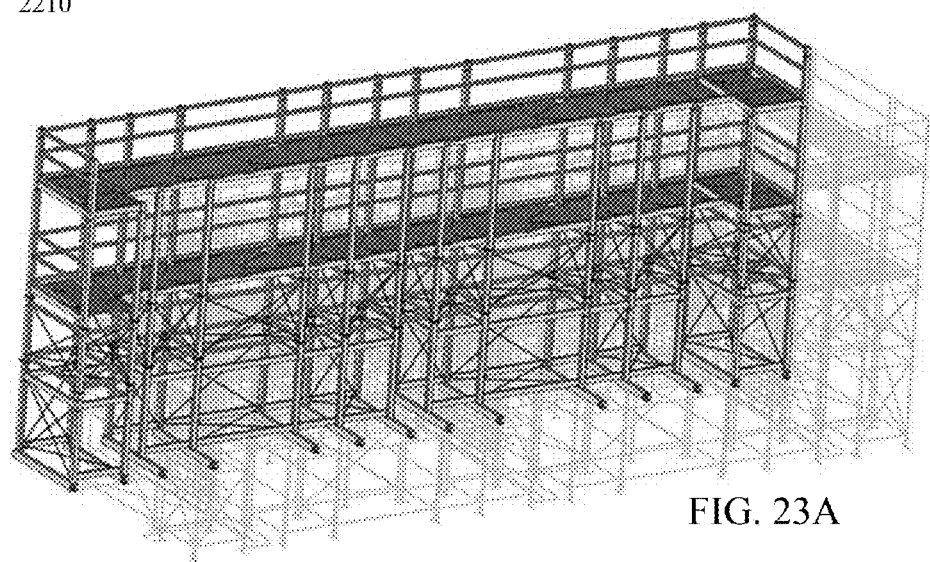
FIG. 23A is an isometric of an exemplary C-Structure.
Figure 23B:
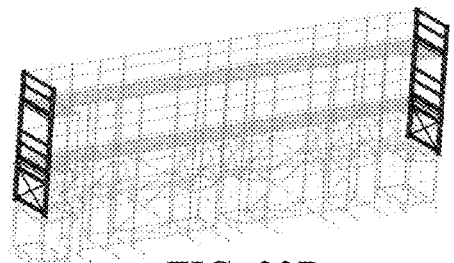
FIGS. 23B-23F are isometrics of C-Structure primary frames.
Figure 23C:
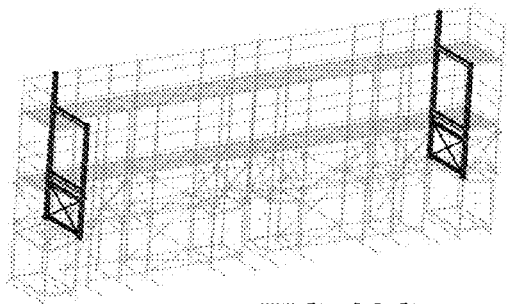
Figure 23D:
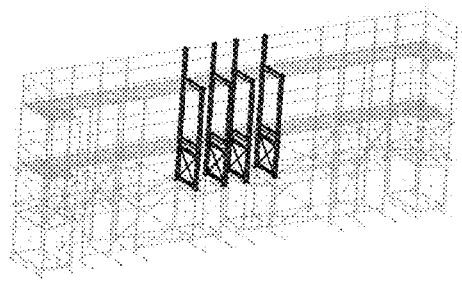
Figure 23E:
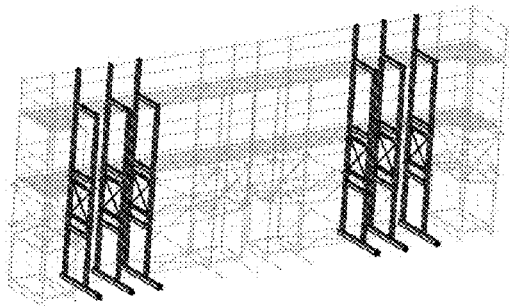
Figure 23F:
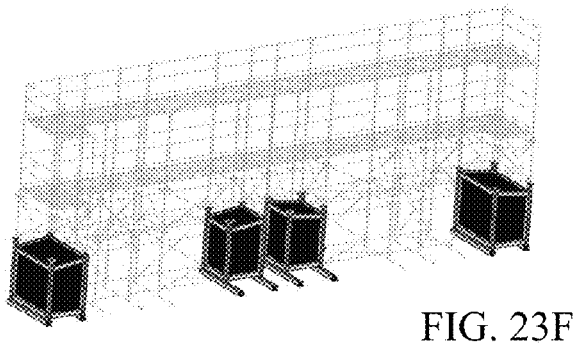
Figure 24A:
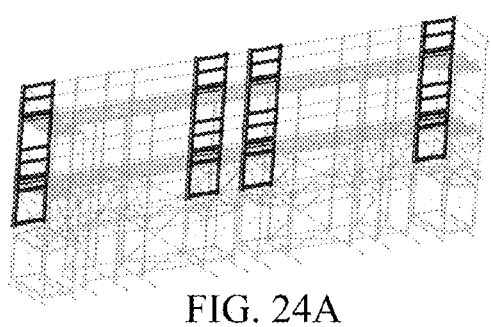
FIGS. 24A-24L are isometrics of C-Structure secondary frames.
Figure 24B:
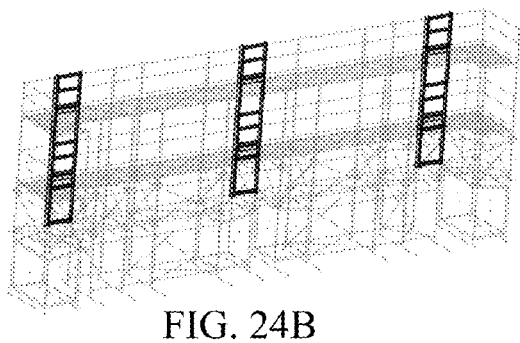
Figure 24C:
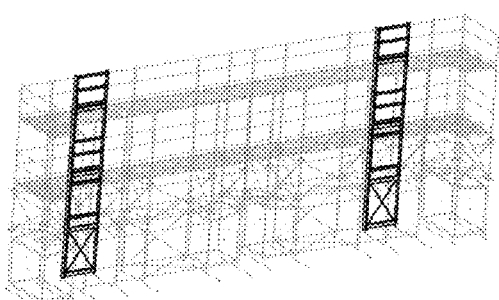
Figure 24D:
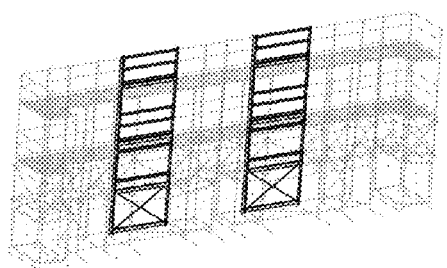
Figure 24E:
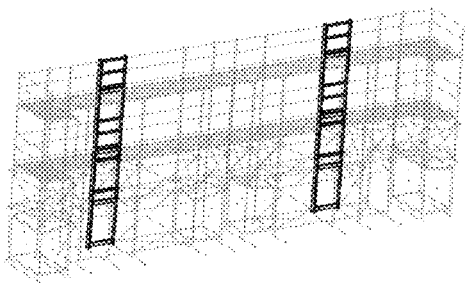
Figure 24F:
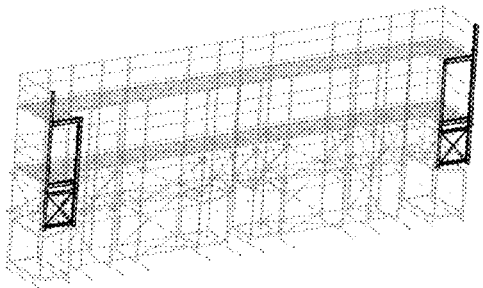
Figure 24G:
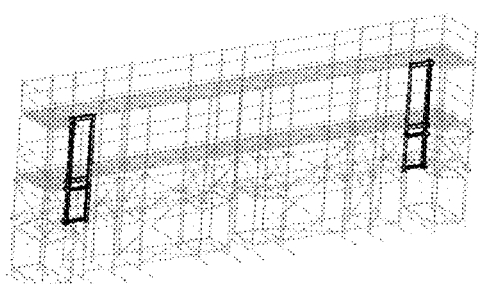
Figure 24H:
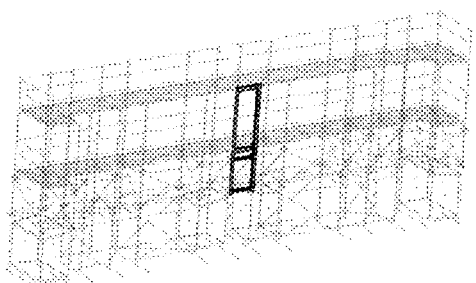
Figure 24I:
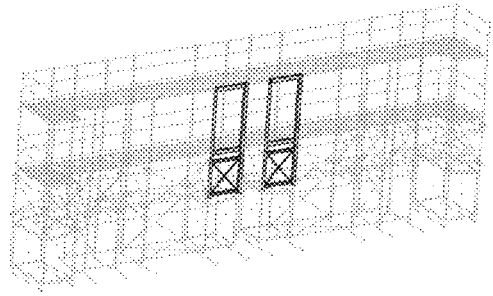
Figure 24J:
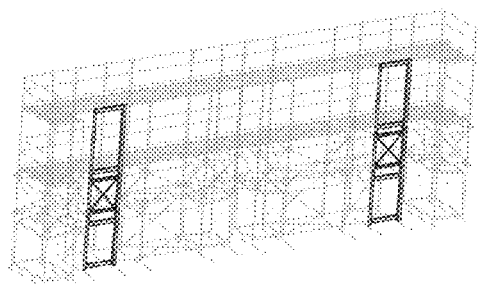
Figure 24K:
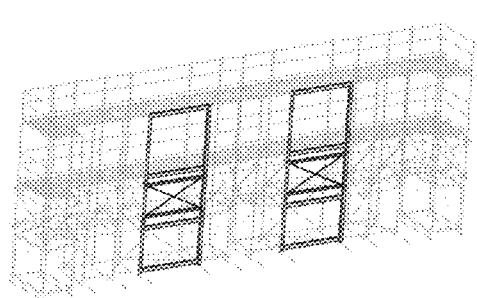
Figure 24L:
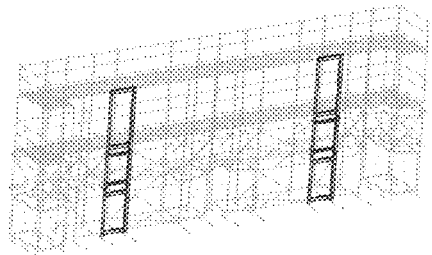

FIGS. 19A-19C illustrate a first type of primary frame for the mobile B-Structures. These may include EME's for enclosing items as described above with regard to the B-Structures. FIGS. 20A-20E illustrate a second type of primary frame for the stationary B-Structures. FIGS. 21A-21I illustrate types of secondary frames for the B-Structures. FIG. 22 illustrates actuator positions for the B-Structures. It should be noted that some actuators 2210 provide for movement of the mobile B-Structures SB1, SB3 and SB5 relative to the stationary structures while other actuators provide for movement of forms or locking of the B-Structures in place.

C-Structure

Figure 25:
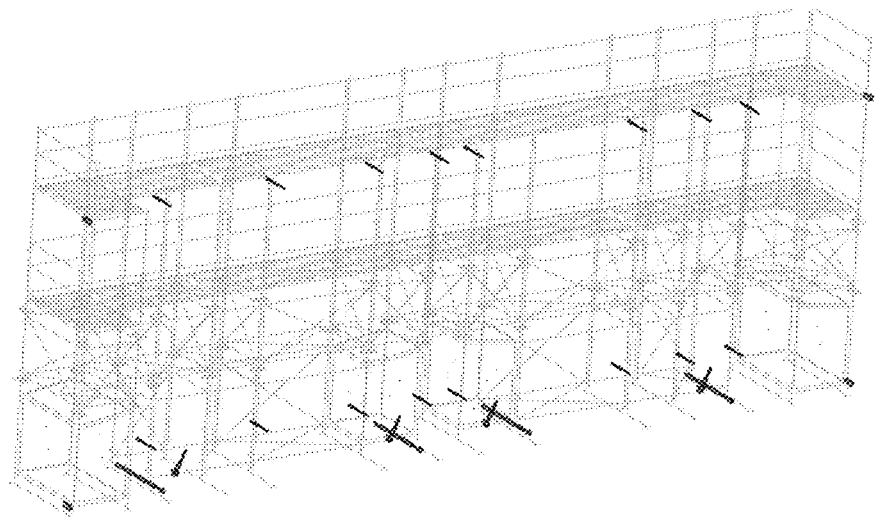
FIG. 25 illustrates actuator positions on an exemplary C-Structure.

FIGS. 23-25 illustrate exemplary frames that may be used to construct a C-Structure according to aspects of the invention. The C-Structure may include five primary frame types, illustrated in FIGS. 23B-23F and may include EME's for enclosing specific items as describe above. The C-Structure may further include twelve secondary frame types, illustrated in FIGS. 24A-24L. In accordance with aspects of the invention, the C-Structure is a mobile structure and accordingly the primary frames have wheels for enabling movement of the C-Structure towards or away from the B-Structure during operation of the RCM. The C-Structure supports forms with molding surfaces for the bottom of the floor of the cast volumetric modular components while the RCM is in the open and ejection configurations. Upon closing the C-Structure into the casting orientation, the actuators lift the form off the C-Structure and onto the D-Structure where it remains during casting of the module. Exemplary positions of actuators supported on the C-Structure are illustrated in FIG. 25.

D-Structures

Figure 26A:
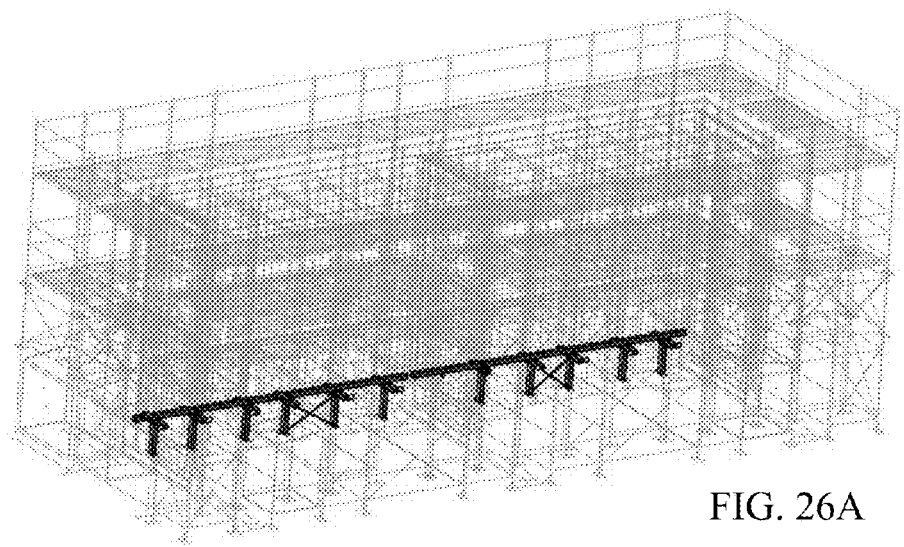
FIGS. 26A and 26B illustrate an exemplary D-Structure.
Figure 26B:
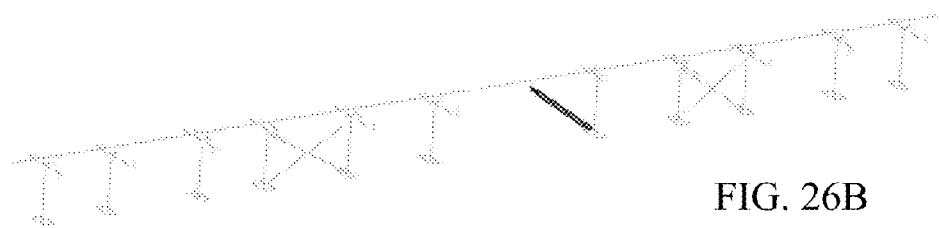

FIGS. 26A and 26B illustrate details of a D-Structure according to an aspect of the invention. The D-Structure may have two segments extending between the tipping machines and anchored to the RCM support surface. The D-Structures are preferably located under the longitudinal wall of the cast module and extend between the tipping machines. The D-structures may include beams covered by form plates and supported by pedestal frames that are anchored to the RCM support surface (typically, a concrete base slab) and bolted to the anchored B-Structures. The D-Structure functions to provide support to the molded component from the underside of the RCM. A D-Structure actuator, depicted in FIG. 26B may rotate the beam segment upward to permit access to the opened form surfaces during the open configuration.

Form System

FIGS. 27-30 depict a form system of an RCM according to an aspect of the invention. The frame structures described above provide support to a form system within the RCM. The form system includes form framing members, which support form plates. The form system also includes hinges and actuators. According to an aspect of the invention, form liners having special architectural finishes or textures may be used to provide aesthetic or other effects to the cast module surfaces. The form framing members and form plates may be made of steel or aluminum, or other suitable material.

Figure 27:
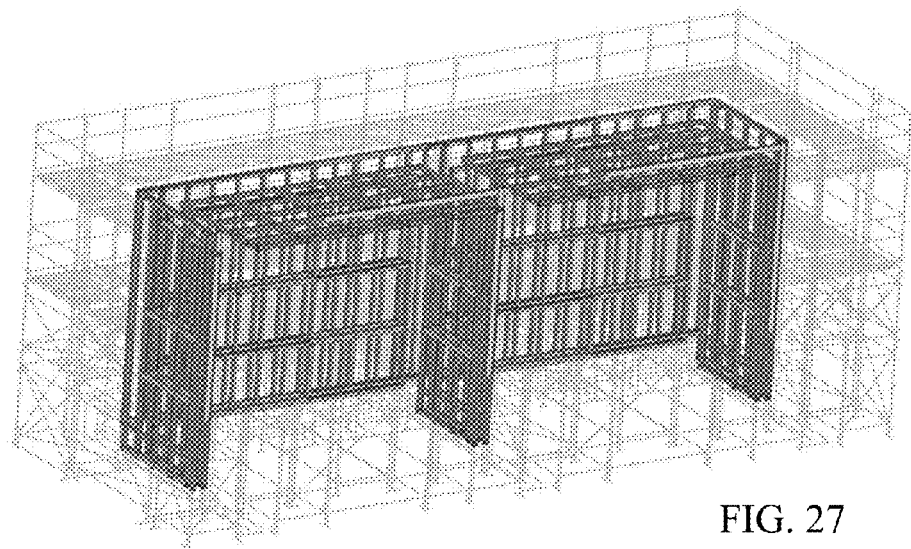
FIG. 27 illustrates exemplary form frames for an RCM.

FIG. 27 illustrates an exemplary set of form framing members supported within the RCM. The form framing members may be movably supported relative to the A-Structure and B-Structure frames.

As discussed above, FIG. 3B illustrates a form plate configuration supported on the form framing members depicted in FIG. 27. The formed surfaces include a) the transverse walls interior surfaces and exterior surfaces (FIG. 28); b) the longitudinal wall interior and exterior surfaces (FIG. 29); c) the deck slab (FIG. 30); and d) the slab edge and transverse wall ends. The wall forms may be segmented to match segments defined by the frames in the structures that support them. For example, the transverse interior wall form segment may be sized and configured to fit onto a correspondingly sized area of B-Structure frames. Moreover, ceiling height adjustment can be made by selecting appropriate sizes for members. Further, in accordance with the portability and mobility advantages provided by the invention, the wall forms segmented structure allows prefabrication of the segments at a source location, remote from the building/casting site. After prefabrication, the segments may be transported to the building/casting site and assembled there.

Figure 31:
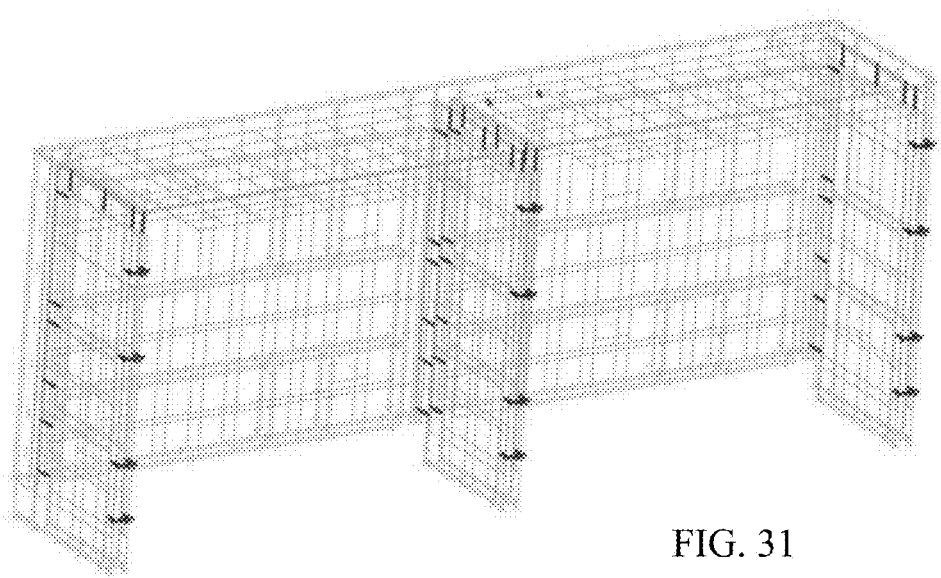
FIG. 31 illustrates the position of form actuators on an RCM.

FIG. 31 illustrates the position of exemplary form actuators that are provided on the RCM to automate the RCM operation and casting process. Actuators connect the form structures/form framing members to the structural frames of the B-Structure. Actuators move the forms, and thus the molding surfaces, into position during operation of the RCM in casting, loading and ejection configurations.

RCM Assembly Process

An exemplary process for assembly of the RCM at a casting site will now be described. As an initial step, a concrete base or RCM support surface may be poured and cured at an appropriate site location. The concrete base will support the stationary and mobile structures of the RCM during operation in producing cast volumetric modular building components.

The tipping machines are first installed on the support surface. Subsequently, the RCM support structures—A-Structure, B-Structure, C-Structure and D-Structure—are assembled using the primary and secondary frames as previously described. The structures are assembled in a reloading configuration, initially (in which the C-Structure is moved away from the A-, B- and D-Structures). Then the actuators and wall form components are attached to their respective supporting structures. The deck forms are then installed and finally the control system is installed and the RCM is operated to a closed configuration and confirmed for readiness for casting.

Control System

The automated operation of the RCM is controlled by an electronic control system, ECS. The ECS' primary functions are to: 1) control the motion of actuators of the RCM to effect automated molding of volumetric modular building components; 2) report on the status and completion of movements of RCM components and monitor the alignment of the RCM components to ensure dimensional accuracy and consistency of the finished modules; 3) control the flow of concrete from the pump; 4) monitor the movements of the moving form structures, form locks, the concrete flow as it fills the forms, and the tipping machines; 5) signal distress, danger or malfunction to the operator; 6) execute a complete stop command from the operator in an emergency situation, and monitor the location of all personnel in the area. The control system may use radio frequency transmission, i.e., wireless transmission, of control commands to receivers associated with the actuators. The ECS may be housed in a handheld or portable unit so that an operator can control and observe operation of the RCM from any location without being tethered by a control or power cord. The ECS may include a user interface, including a keyboard and screen for enabling user interaction. The ECS may also issue control warnings and flags, as well as instructions to personnel to effect efficient operation and increase safety.

The ECS may include a programmable logic controller (PLC) that provides for the sequenced operation of the actuators on the RCM and corresponding control of movement of form molding surfaces and/or structural components according to software that includes instructions executed by a processor.

RCM Operation

The RCM operation is a repetitive process, which preferably includes four primary steps:

a) the RCM is moved to an open configuration in which it can be cleaned and in which reinforcing assemblies and other embedded items are secured to the wall and deck forms;

b) the RCM is closed and the mold receives concrete, which is pumped through the wall forms and which is conveyed to the top deck, which is cast to be the module, and finishing the exposed surfaces with desired textures, coatings or other finishes;

c) curing the concrete;

d) opening the forms to allow ejection of the cast module; and e) repeating the process, beginning with the cleaning step. The steps of the RCM operation will be described assuming that the RCM is first in a closed position and a cast and cured module is situated within the RCM mold. At this stage, the molded component is ready for ejection from the RCM.

Module Ejection

Door Frame Release—

Figure 32A:
FIGS. 32A and 32B illustrate door frames for an RCM.
Figure 32B:
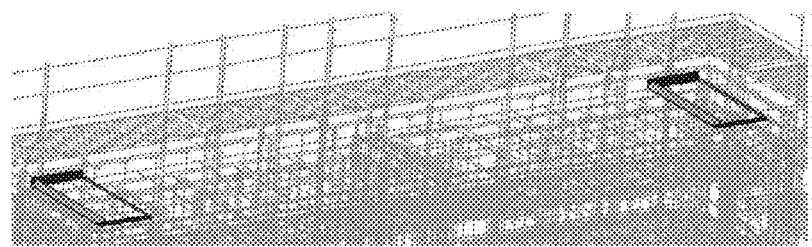

The first step is release of the door frame forms, which are located on the top deck (see FIGS. 32A and 32B). The cast module has been omitted from the view shown in these Figures. As will be recognized by those of ordinary skill in the art, the door frame forms will form respective doorways in the cast top deck (module longitudinal wall). The door frame forms may be hinged to the deck form plates (not shown in FIGS. 32A and 32B) and may be locked in a vertical position (FIG. 32A) using releasable implements, such as sliding bolts. When the door frame forms are moved to an open position, they are folded down (see FIG. 32B) so that they can be passed through the formed doorway when the module is ejected from the RCM. Release (opening) of the doorframes is preferably a manual process, as this is economical since workers can readily walk on the cured concrete surface to access the door frame forms. However, automated features may be provided on the door frame forms without departing from the spirit and scope of the invention.

Transverse Wall End Forms Release—

Figure 33:
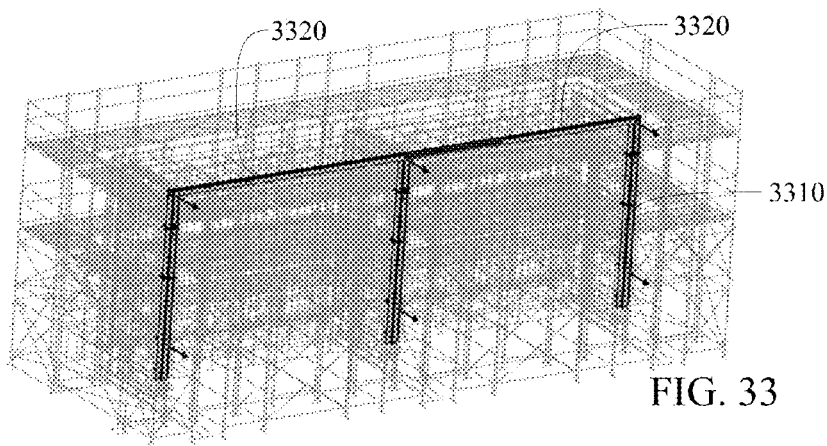
FIG. 33 illustrates a deck edge form and transverse wall end forms for an RCM.
Figure 34A:
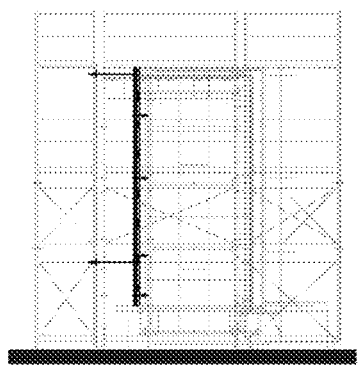
FIGS. 34A and 34B illustrate a deck edge form and wall end form closed and open positions, respectively.
Figure 34B:
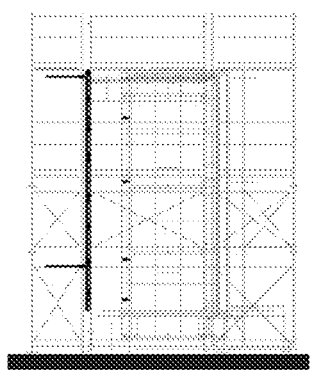

Transverse wall end forms 3310 and the deck edge forms 3320 (FIGS. 33, 34A and 343B) are mounted for movement relative to the A-Structure. They are opened automatically, using actuators that link the forms to the A-Structure. The actuators move the forms in a direction that is parallel to the direction in which the transverse walls extend. FIG. 34A shows the forms in a closed position, in which they extend within the B-Structure framework and engage the transverse wall lateral forms to form a mold for the transverse walls. Actuators retract the transverse wall end forms towards the A-Structure. Retraction of the forms permits the cast transverse walls to be rotated out of the mold to facilitate ejection of the cast modular component from the mold, as will be described.

Three-Dimensional Inside Corner Forms Release—

Figure 35A:
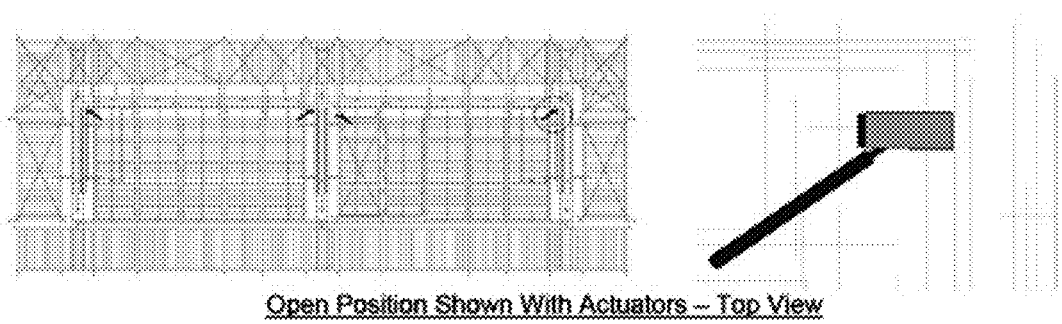
FIGS. 35A and 35B illustrate a 3-dimensional inside corner form for an RCM.
Figure 35B:
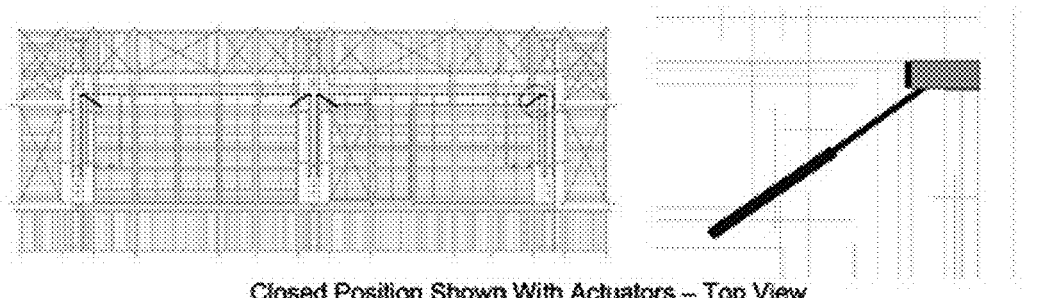

According to an aspect of the invention, three-dimensional corner molds are provided during casting and are retracted before the horizontal and vertical inside corner molds are rotated to their open positions. The horizontal corners are located where the inside transverse walls meet the underside of the top deck. The inside vertical corners are located where the inside transverse wall forms intersect with the inside longitudinal wall forms. FIGS. 35A and 35B show the position of the inside corner forms. Release of these corner forms allows the inside transverse walls to be moved. Release is accomplished through action of actuators which retract to remove a form surface from the inside corner. The structural angles that are at the top of the transverse wall forms and the structural angles that are at the side of the transverse wall forms are connected to the form plates by long hinges. The width of the horizontal and vertical legs of these forms may be different so that the vertical angle, when folded may overlap the horizontal folded leg.

Figure 36A:
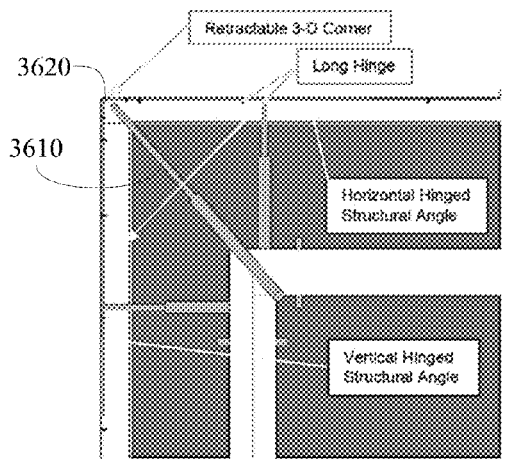
FIGS. 36A-36C illustrate additional details of a 3-dimensional corner form for an RCM.
Figure 36B:
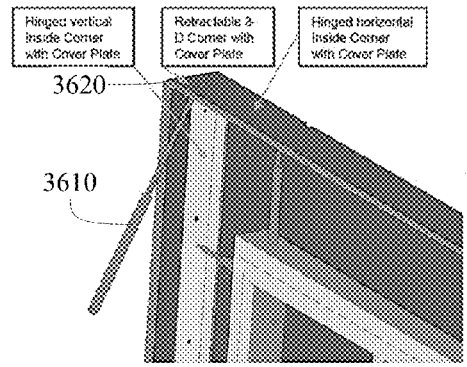
Figure 36C:
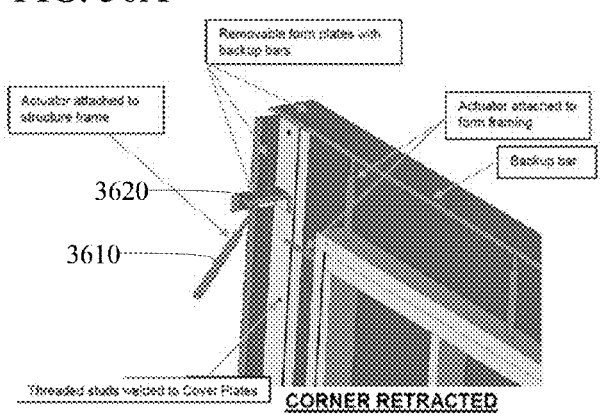

FIGS. 36A-36E further detail the construction of three-dimensional inside corner forms according to an aspect of the invention. An actuator 3610 retains the corner form 3620 in a closed position (shown in FIGS. 36A and 36B). FIG. 36C shows the corner retracted as the actuator pulls it from the closed position. Once the corner form plate is in the retracted (mold open) position, the horizontal and vertical inside corner forms can be pivoted away from the position shown in FIG. 36C.

Horizontal Inside Corner Forms Release—

Figures 36D, 36E:
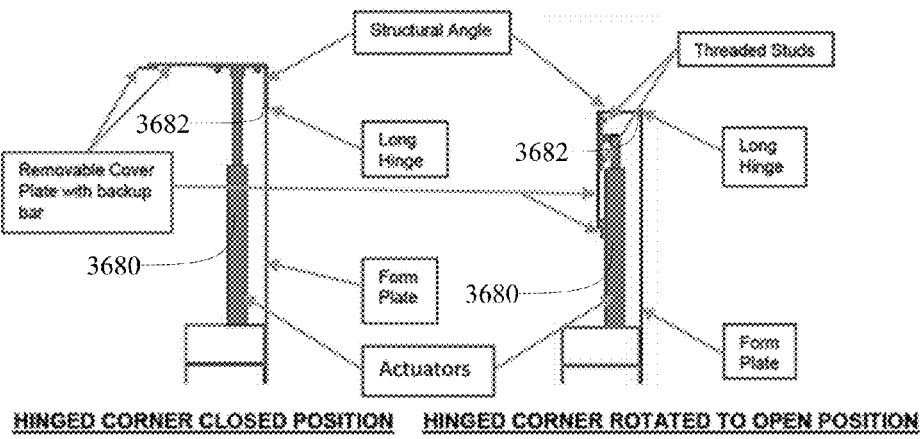
FIGS. 36D and 36E illustrate hinged corner forms for interior corners for an RCM.
Figure 37A:
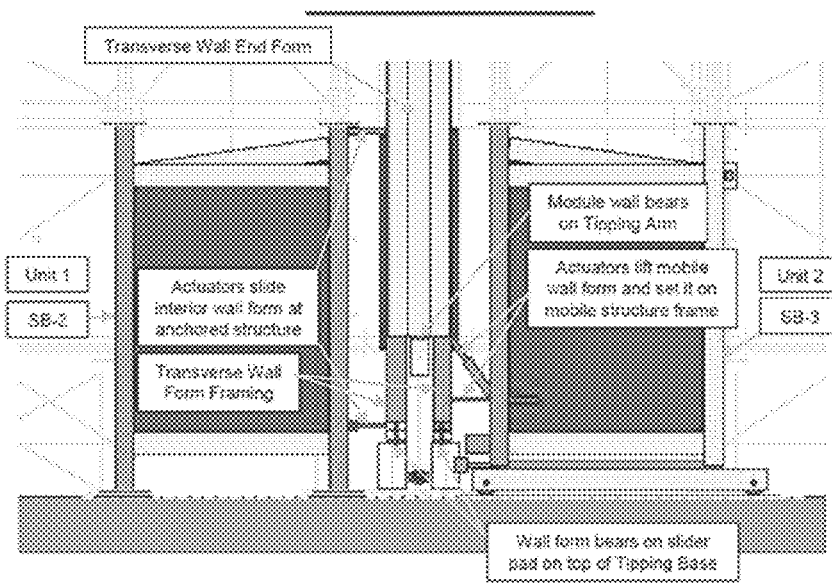
FIGS. 37A and 37B illustrate base sections for molds for transverse walls and a longitudinal wall, respectively.
Figure 37B:
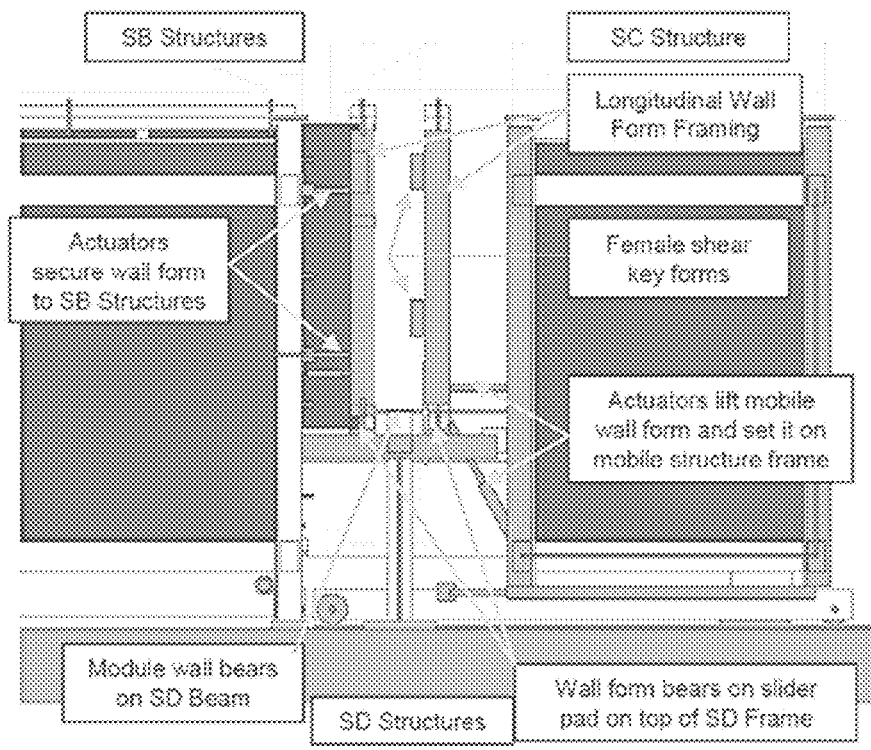
Figure 38A:
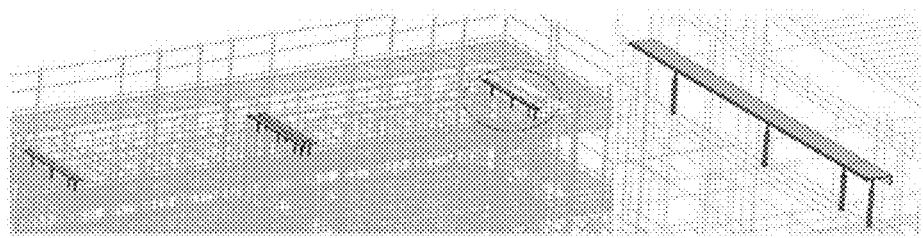
FIGS. 38A and 38B illustrate horizontal inside corner forms for an RCM.
Figure 38B:
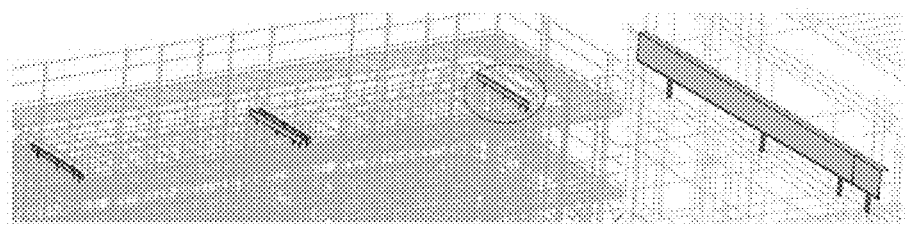

Horizontal inside corners are located at the intersection of the transverse wall and the underside of the top deck (longitudinal wall). The corner forms are constructed of structural angle and a cover plate. The vertical leg of the angle is attached to the adjacent wall form plate with a continuous long hinge. The cover plate, which is the same thickness and length as the deck form plates, has threaded studs welded to the bottom, which are inserted thru and fastened to the horizontal leg of the corner angle. The width of the cover plate may be adjusted as needed to accommodate the desired transverse wall thickness. The corner angles are opened by the actuators pulling them down so they rotate about the long hinge and fold against the surface of the transverse wall form plate as shown in FIGS. 38A and 38B. Referring additionally to FIGS. 36D and 36E, the hinged corner is pivoted downward under action from an actuator 3680. A pivot joint 3682 allows the form plate to pivot to the position shown in FIG. 36E. A removable cover plate allows for adjusting the thickness of transverse walls.

Vertical Inside Corner Forms Release—

Figure 39A:
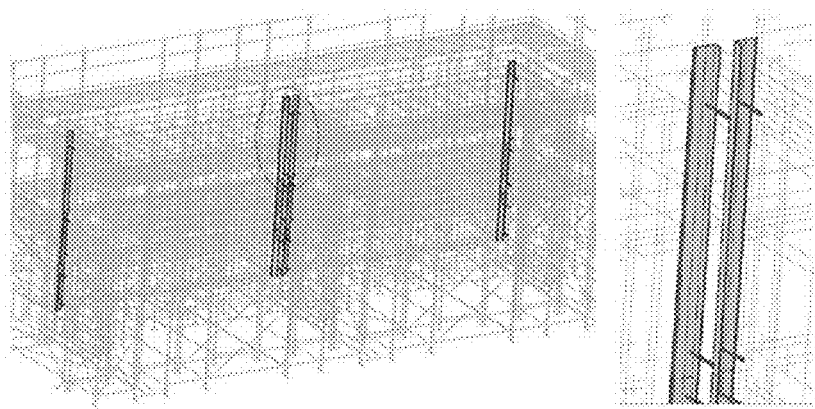
FIGS. 39A and 39B illustrate vertical inside corner forms for an RCM.
Figure 39B:
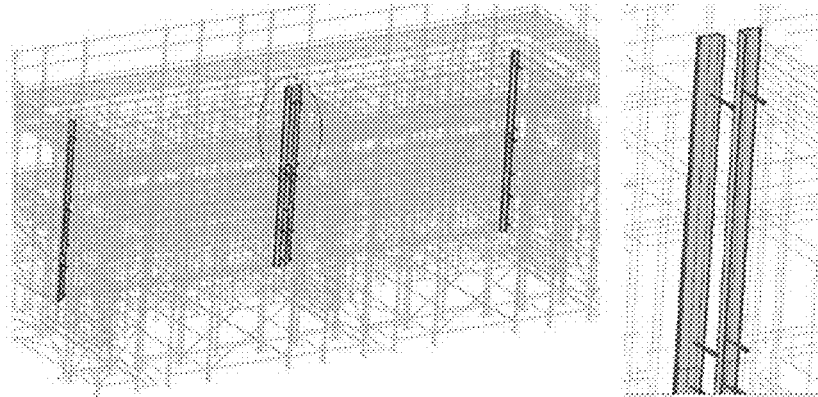

The next step is to open the vertical inside form corners, which are located at the intersection of the transverse and the longitudinal wall forms. Like the horizontal corners, these vertical corners are also made up of a structural angle with its transverse leg attached to the adjacent transverse wall form plate with a continuous long hinge. The longitudinal leg of the angle has the cover plate to match the longitudinal form plates, and is also adjustable to accommodate the transverse wall thickness. The actuators pull the corner inward to so that it will rotate about the long hinge and fit against the transverse wall plate, as shown in FIGS. 39A and 39B. This completes the clearance of the form corners and allows the transverse wall form to be moved.

Transverse Wall Form Release—

In the next step the transverse wall forms are moved by their respective supporting structure actuators one or two inches away from the concrete surfaces on the slide pads on top of the tipping base members. The exterior longitudinal wall form is also moved away from the outside of the wall onto the mobile C-Structure support brackets, as shown in FIGS. 40A and 40B. As will be recognized by those of ordinary skill in the art, it is not necessary to move the inside longitudinal wall forms and the deck forms are not moved because these forms will not interfere with the module as it is ejected.

Movement of C-Structure to Ejection Position—

The next step in the molding process is to move C-Structure away from the B-Structure (and A-Structure) to permit a transport to be positioned adjacent to the cast module to receive it after ejection (FIG. 10). The movement of the C-Structure may be accomplished in two stages. First, actuators release the C-Structure during an initial phase of movement and push it away from the anchored, stationary A-Structure and B-Structure. Then, the C-Structure, as well as the exterior longitudinal wall form mounted thereon, is moved the remaining distance to an ejection position under separate power from the actuator power, such as powered wheels provided on the C-Structure, or by a cable and pulley system provided with the RCM, or by a forklift or other vehicle.

Transport Moved to Loading Position—

In preparation for ejection of the cast volumetric modular component from the RCM, a transport is positioned at an ejection position as shown in FIG. 7. Transport may be a tractor-trailer or any transport surface capable of supporting the load of the cast module. The transport preferably has adjustable load pads that are moved to a position coinciding with the transverse walls of the module. This prevents undue stresses from developing in the module during transport. The load pads also automatically maintain the module in a level position as it is moved, and they measure and record the weight of the module at those load points.

Tipping/Ejection of the Cast Module—

Before the tipping process begins, a cable from a motorized pulley system in the Tipping Base is attached manually to the module to control the position of the module as it is tipped.

Then the automatic tipping process begins with the first partial movement, which is accomplished by the vertical actuator under the end of the tipping arm pushing upward (FIGS. 9A and 9B). Then the horizontal actuator under the tipping arm takes over by extending itself and thereby pushing against the short vertical leg attached to the bottom of the tipping arm (FIGS. 9C and 9D). At this point the actuator on top of the tipping arm holding the module up is begun to move down the arm while the arm continues to rotate. These two motions are shown separately in FIGS. 9E/9F and FIGS. 9G/9H. When the module is supported by the transport trailer, the cable is released and retracted by the pulley system, and the tipping arm is retracted to its initial position. Then at this point, the module and trailer are pulled on to a module finishing station, and the RCM is prepared for the next module to be cast.

RCM Configures to the Reloading Configuration—

Figure 42A:
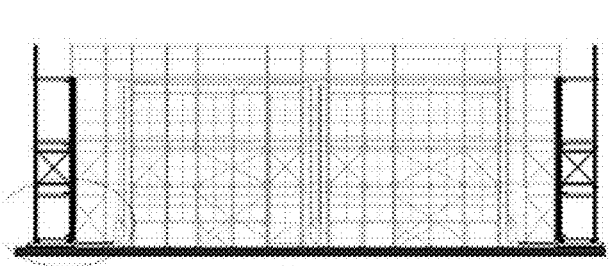
FIGS. 42A and 42B illustrate mobile B-Structures being pushed away from an anchored tipping base by an actuator.
Figure 42B:
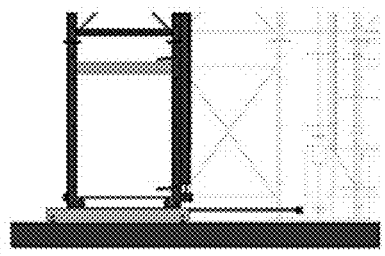

At this point the automatic process resumes as the RCM opens itself to its Reloading Position. The first step in this part of the process is to open the exterior mobile B-Structures, SB1 and SB5. The structure actuators lift the transverse wall forms and move them onto brackets on the structures that support them as they are moved and until later in the process when they are reset on the respective tipping base members (FIGS. 41A and 41B). Next, the actuators push the structure away from the fixed tipping base member (FIGS. 42A and 42B). Lastly, the actuators are retracted leaving an open aisle to access the forms.

Figure 43A:
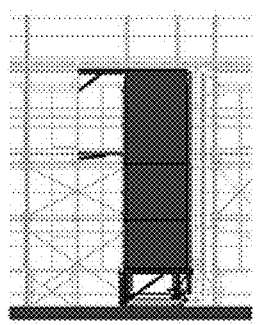
FIGS. 43A-43C illustrate catwalk and deck forms being raised for a B-Structure.
Figure 43B:
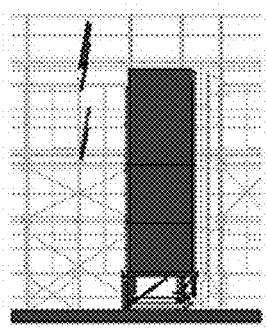
Figure 43C:
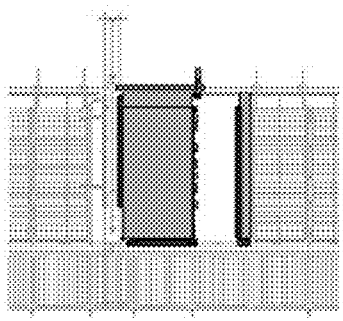
Figure 44A:
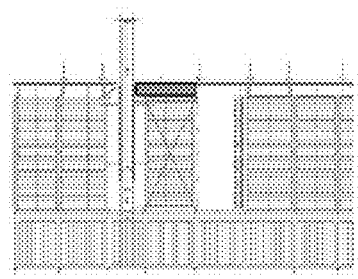
FIGS. 44A and 44B illustrate a B-Structure form deck being raised.
Figure 44B:
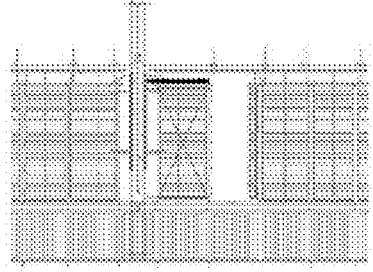
Figure 45A:
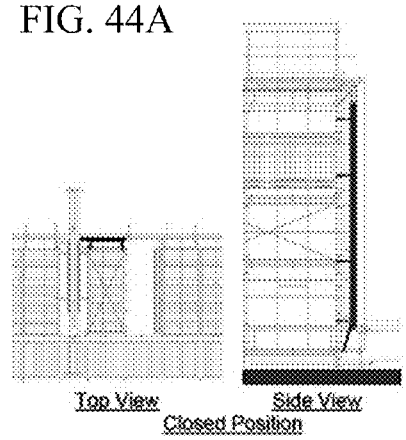
FIGS. 45A and 45B illustrate a longitudinal wall form panel being moved onto a mobile B-Structure.
Figure 45B:
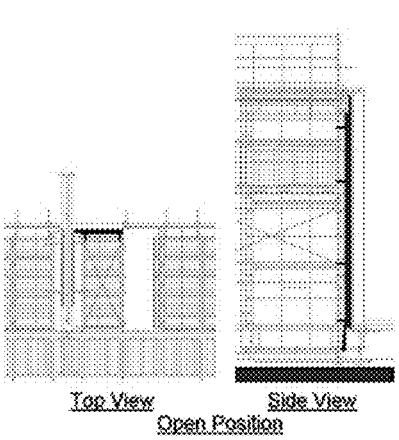
Figures 46A, 46B:
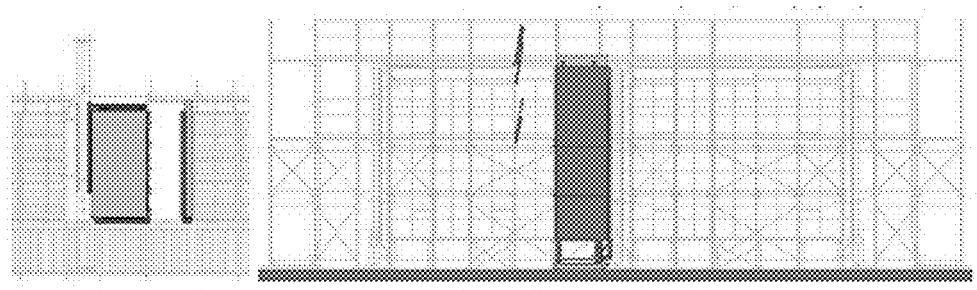
FIGS. 46A, 46B, 47A and 47B illustrate actuators on a mobile B-Structure moving it into an adjacent open space.
Figures 47A, 47B:
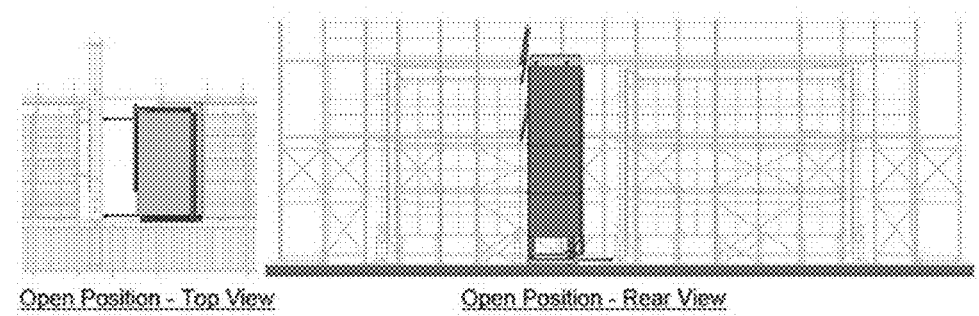
Figures 48A, 48B:
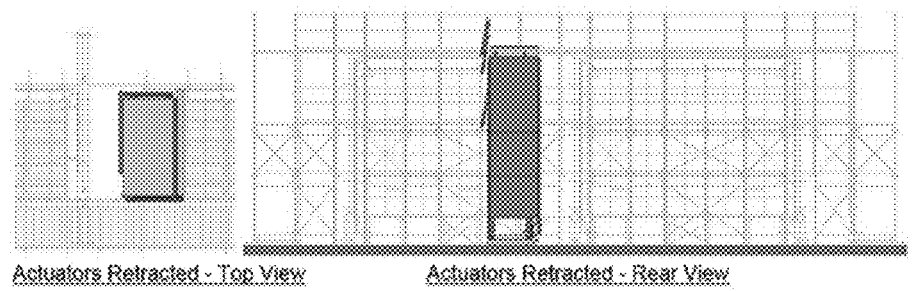
FIGS. 48A and 48B illustrate retraction of actuators on a mobile B-Structure.
Figures 49A, 49B:
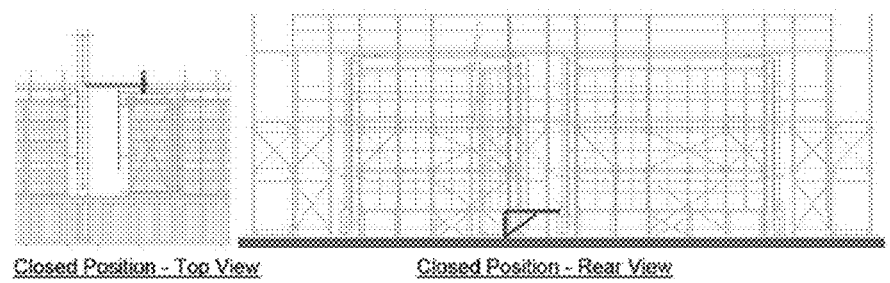
FIGS. 49A, 49B and 50A, 50B illustrate movement of a D-Structure portion.
Figures 50A, 50B:
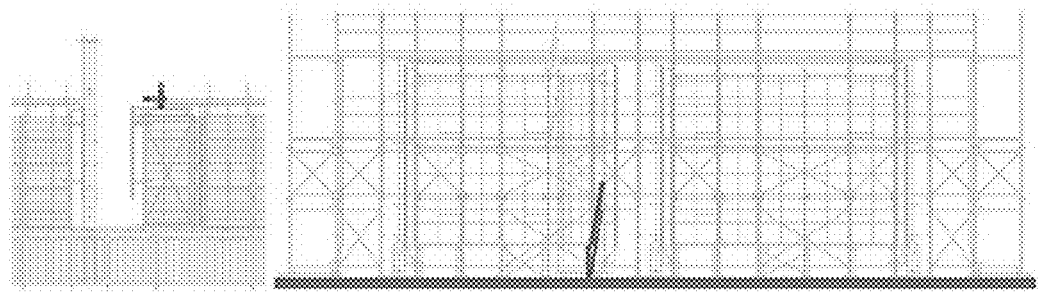
Figure 51:
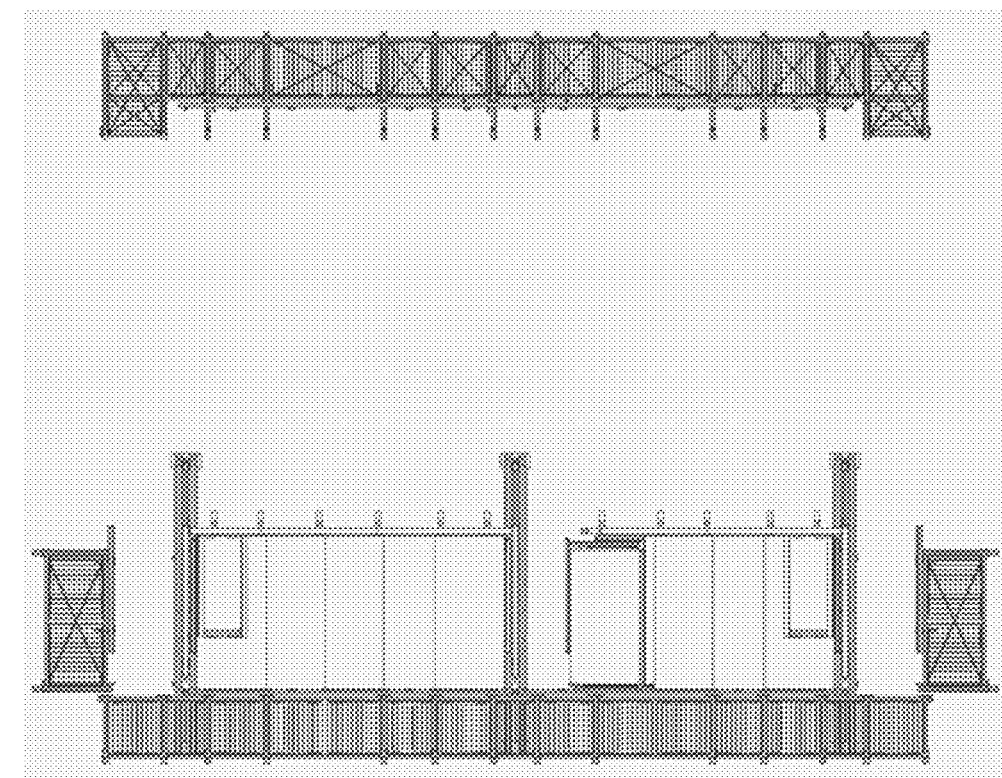
FIG. 51 illustrates an RCM in an open position for cleaning.
Figures 52A, 52B:
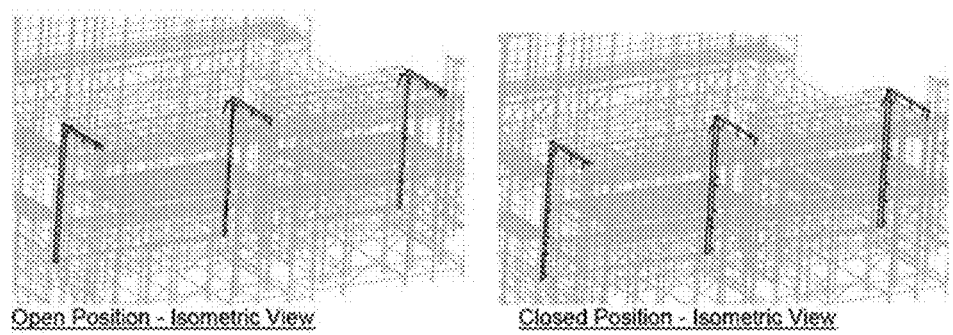
FIGS. 52A and 52B illustrate inside corner forms being reset to a closed position.
Figure 52C:
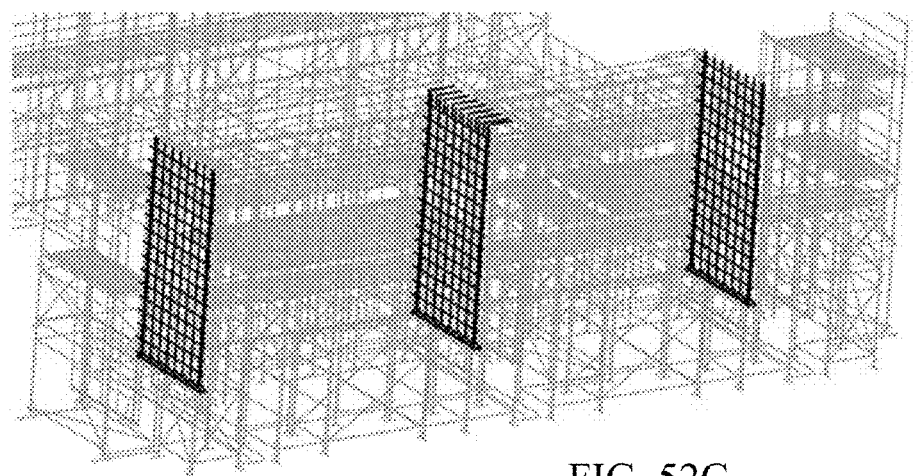
FIG. 52C illustrates installation of prefabricated reinforcing assemblies within the transverse wall molds.
Figure 53A:
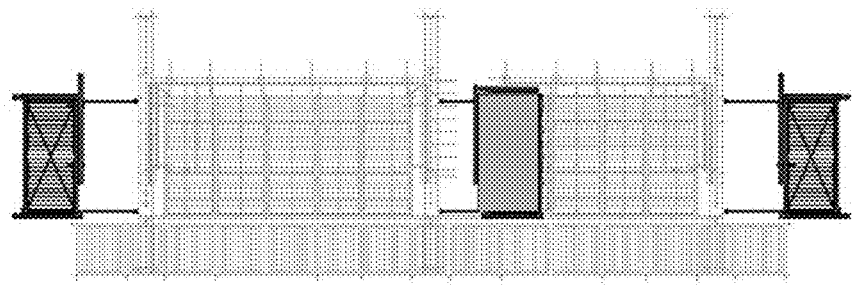
FIGS. 53A-53C illustrate movement of a B-structure to a locked position prior to casting.
Figure 53B:
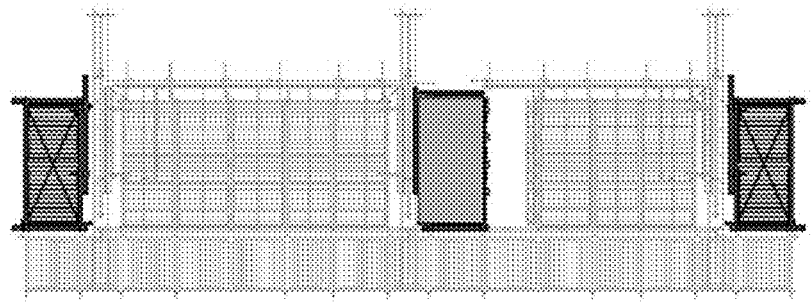
Figure 53C:
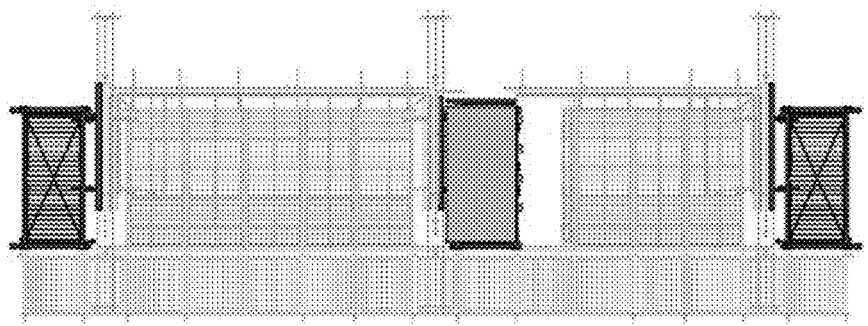
Figure 54:
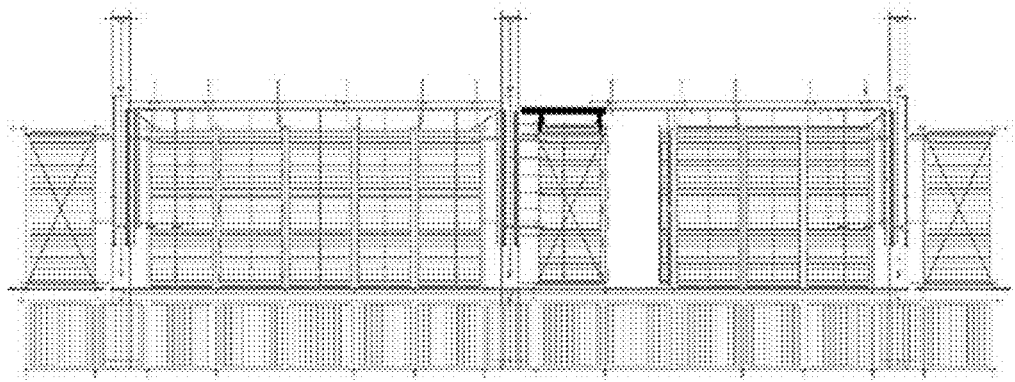
FIG. 54 illustrates resetting of a longitudinal form to a closed position.
Figure 55:
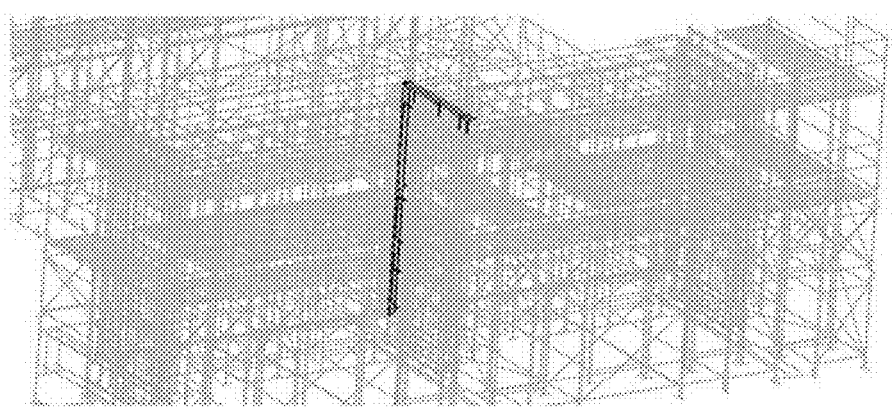
FIG. 55 illustrates resetting of inside corners to a closed position.
Figure 56:
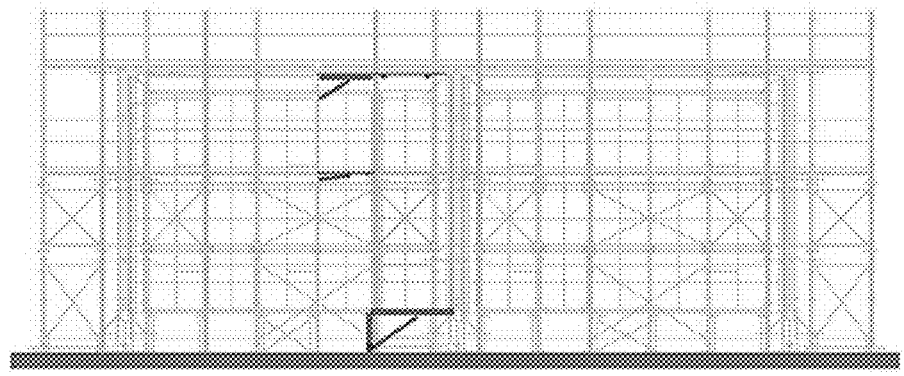
FIG. 56 illustrates resetting of D-Structure components to a closed position.
Figure 57:
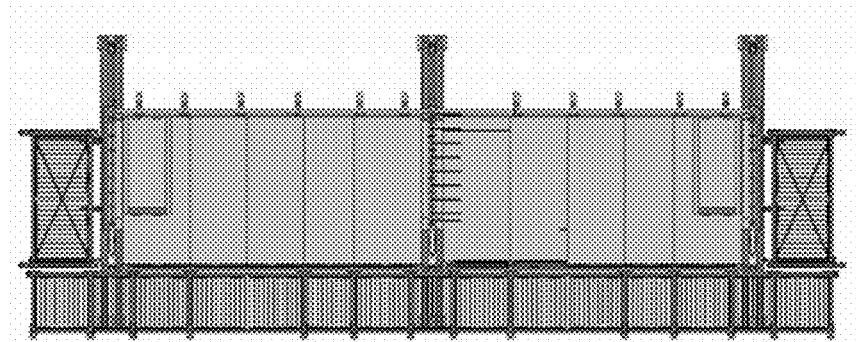
FIG. 57 illustrates a reset position of an RCM for longitudinal wall reinforcing.
Figure 58:
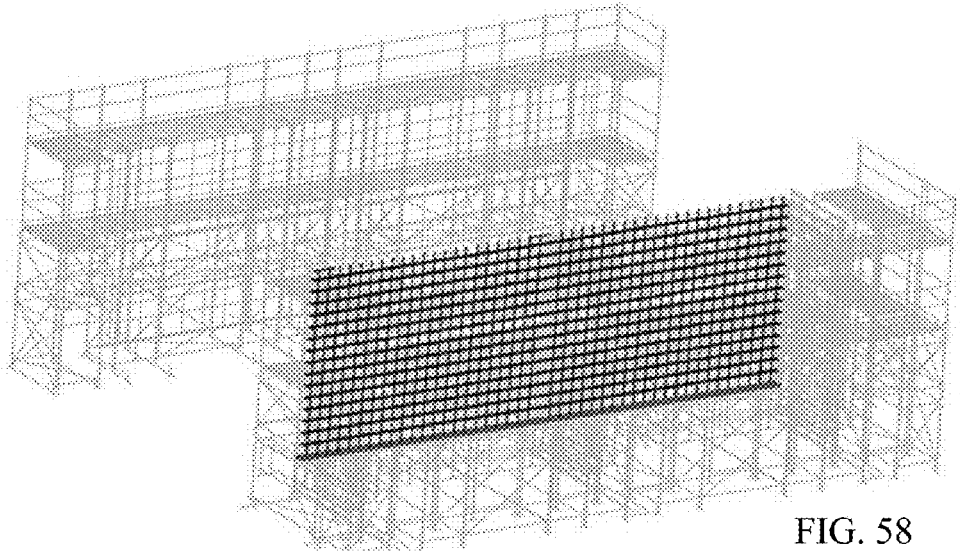
FIG. 58 illustrates installation of longitudinal wall reinforcing.

The next part of the automatic process is the opening of the interior transverse wall form and movement of the interior mobile B-Structure, which involves the following steps. The adjacent catwalk and deck form are raised to make room for the structure movement (FIGS. 43A, 43B and 43C). Next the B-Structure top deck is raised to make room for the structure and wall form movements (FIGS. 44A and 44B). Next the longitudinal wall form panel adjacent to the mobile B-Structure is moved onto the B-Structure brackets that will support it during the move of the mobile B-Structure (FIGS. 45A and 45B). Next the actuators on the mobile B-Structure are extended to push against the anchored tipping base member and move the mobile B-Structure into the adjacent open space (FIGS. 46A, 46B, 47A, 47B). The next step is to raise the portion of the D-Structure that would otherwise obstruct access to the space between the middle transverse wall forms (FIGS. 49A, 49B, 50A and 50B). At this point in the automatic process, all the forms and structures are in their fully open positions, and the RCM can be cleaned as required (FIG. 51). Then after cleaning, there is one more automatic process required to place the RCM into its initial Reloading Position. With this process, the wall forms that are supported by anchored structures are reset to their Casting Position. Then the form corners are reset to their closed positions (FIGS. 52A and 52B), which is a reverse of the steps shown above. This completes the automatic process of setting the RCM to the initial Reloading Position so that the prefabricated reinforcing assemblies and other embedded items can be manually installed and attached to the fixed wall forms (FIG. 52C). The next automatic process closes the RCM mobile B-Structures to their locked Casting Position so that the longitudinal wall reinforcing can be installed, which involves the following steps. First the actuators are extended and locked onto the adjacent anchored tipping base members (FIG. 53A). The actuators are then retracted to pull the mobile structures back to their closed positions (FIG. 53B). The structures' actuators then reset the forms in their closed positions (FIG. 53C). Next, the longitudinal form segment is reset to its closed and locked position (FIG. 54). Next, the inside corners are reset to their closed position (FIG. 55). Finally the raised D-Structure component and the adjacent raised catwalk and deck form are lowered back to their closed positions (FIG. 56). This completes the automatic process that puts the RCM into its second Reloading Position (FIG. 57) for the loading of the longitudinal wall reinforcing and other embedded items (FIG. 58).

Figures 59A, 59B:
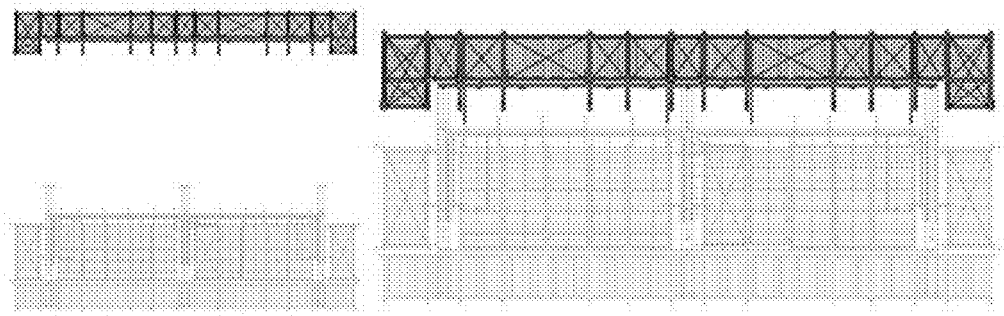
FIGS. 59A and 59B illustrate relocation of a mobile C-Structure to a closed position.
Figure 60A:
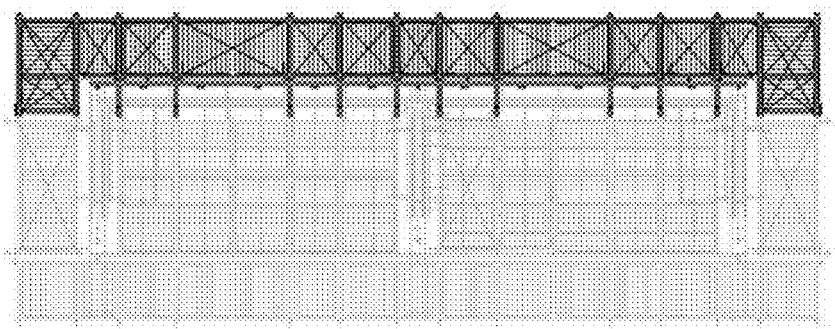
FIGS. 60A and 60B illustrate closure and locking of a C-Structure and closing and locking of longitudinal wall forms.
Figure 60B:
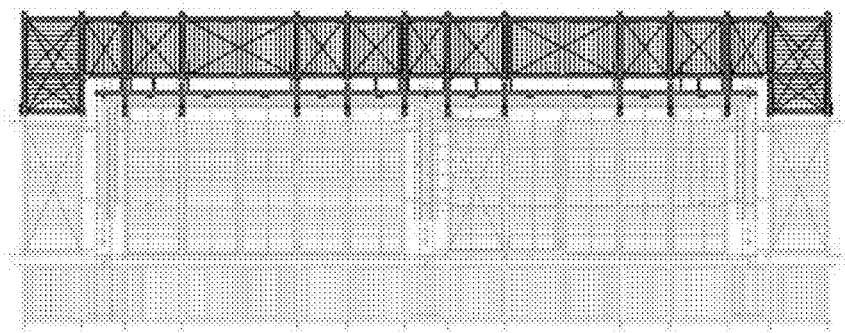
Figure 61:
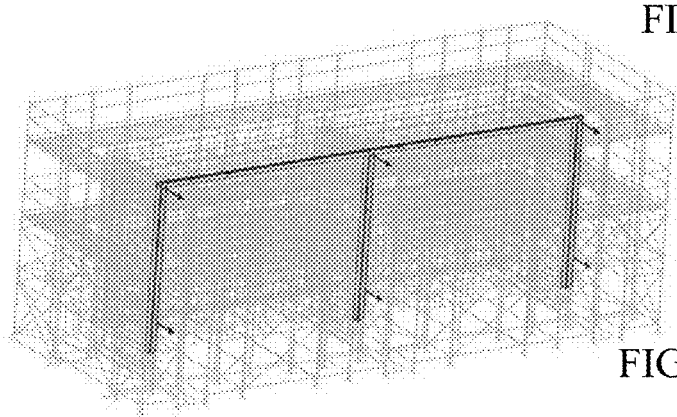
FIG. 61 illustrates closure and locking of deck edge and wall end forms.
Figure 62:
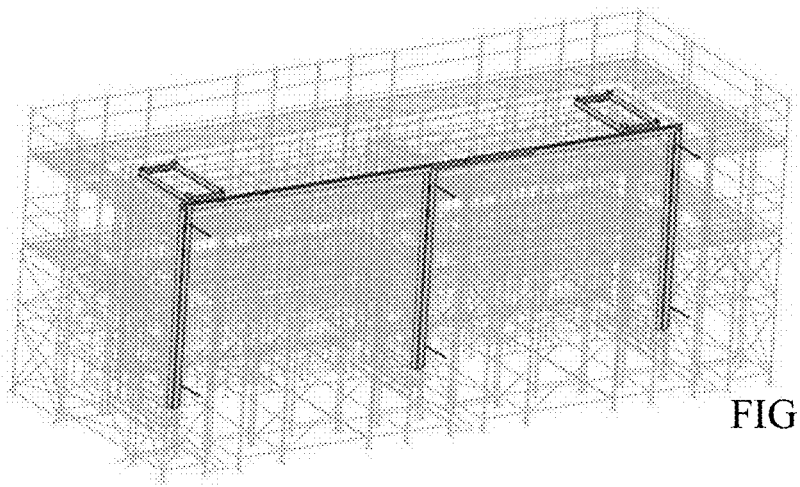
FIG. 62 illustrates resetting of door frames.
Figure 63:
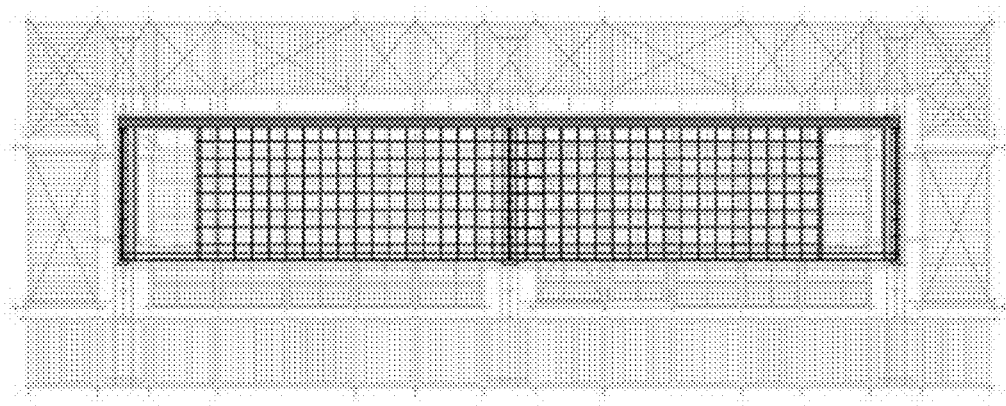
FIG. 63 illustrates top deck reinforcing installation.
Figure 64:
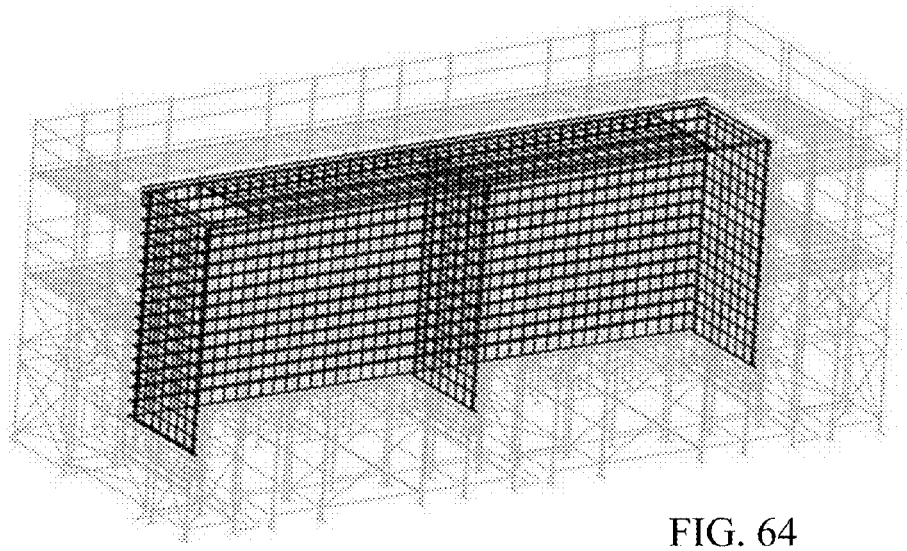
FIG. 64 illustrates an RCM in a closed position for receiving concrete.
Figure 67:
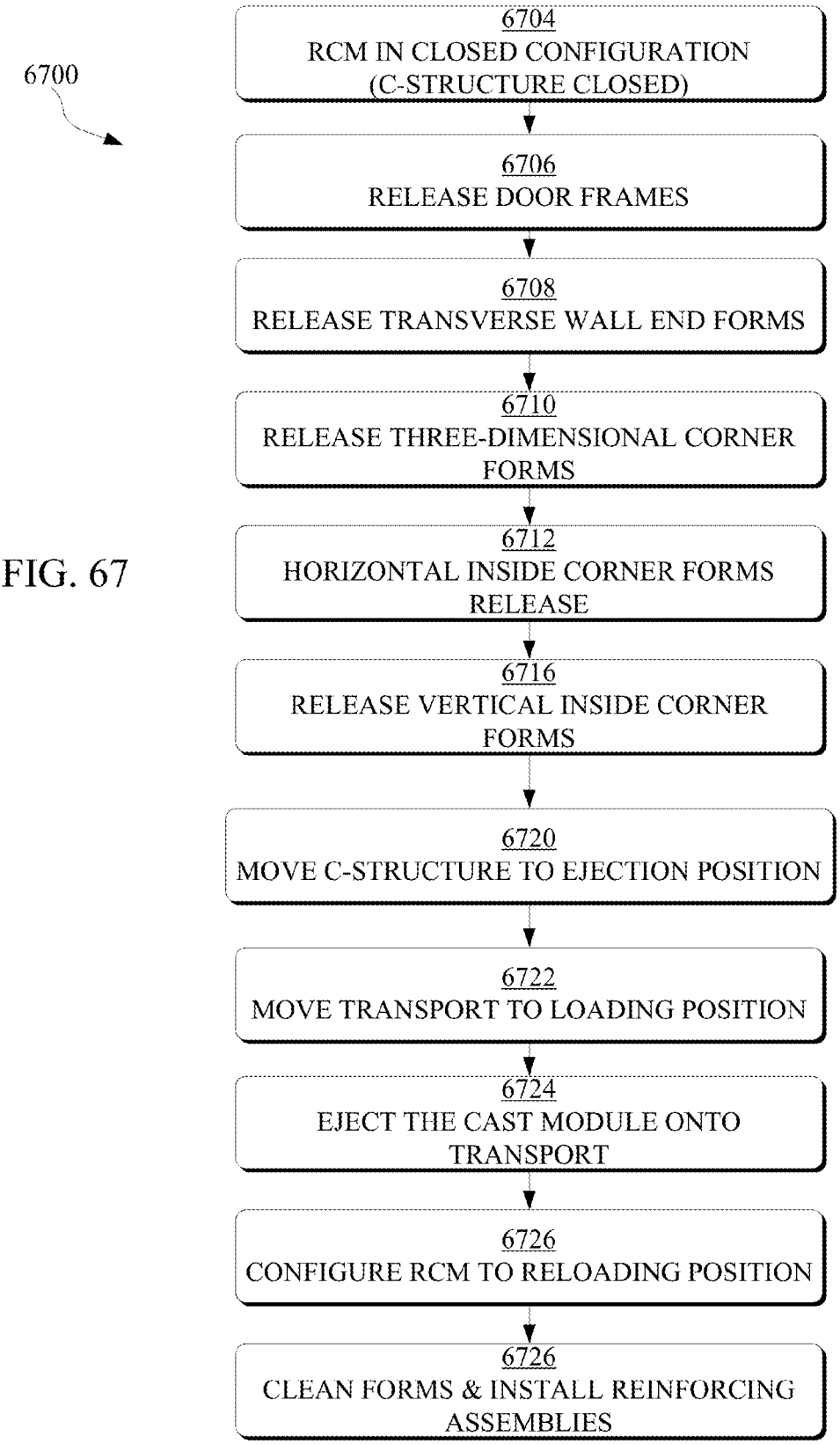
FIG. 67 illustrates a process according to an aspect of the invention.

Next the mobile C-Structure is moved back into position with its actuators extended and locked onto the anchored D-Structure (FIGS. 59A and 59B). At this point another automatic process is initiated causing the actuators to contract and pull the mobile C-Structure into its closed and locked position (FIG. 60A). Continuing the automatic process, the longitudinal wall forms are reset to their closed position (FIG. 60B). And, the last step in the automatic process is to reset the deck edge form and transverse wall end forms (FIG. 61). Then the manual process resumes with resetting the door frame forms (FIG. 62). The final step in preparation of the RCM for casting the concrete is to install the deck reinforcing and other embedded deck items (FIG. 63). FIG. 64 shows the RCM in a closed position, with reinforcing members for the transverse and longitudinal walls, as well as the floor, installed and ready to receive concrete. FIG. 67 illustrates a process as described above.

Finishing Station—

According to an aspect of the invention, the RCM may form a part of an assembly-line for casting and finishing concrete volumetric modular building components. The finishing station may be an elevated platform at a height that permits access to the floor surface of the module on the trailer. While at the finishing station, personnel may: a) clean and touch up the concrete surfaces as needed, b) install the optional finishing components, c) load into the module the finishing materials that will be needed after it is erected, d) optionally enclose the module in house wrap to protect it from the weather during erection into the building; and e) attach the lifting device and adjust it to the center of mass so the crane operator can attach the crane's lifting clevis.

Module Lifting Device—

A lifting device may be provided to erect the module into a building. The lifting device may consist of cables and one transverse beam located above each transverse wall, and one longitudinal beam. Cable connection devices may be cast into the edge of the floor slab where it intersects with the transverse walls of the module, and after erection they may be cut away and recycled. The leveling and weight sensors on the transport trailer are used by an on-board processor that radios instructions to the motor operated gears on the lifting beams. Based on these signals, the longitudinal beam is moved to the center-of-mass in the transverse direction, and the clevis attachment point for the crane is moved longitudinally along the longitudinal beam to the longitudinal center-of-mass. This system allows for the balancing of the module just as it is lifted off the trailer with its full load in place.

Flexibility & Economy

The modular configurations and RCM described herein provide economy (reduced cost of the completed building) compared to other construction methods with similar quality and anticipated building useful life cycle, while at the same time allowing high safety and quality standards. Labor cost reduction is enabled by a) mechanized and automated form placement, b) performing operations at ground level, c) reducing the required skill of most of the personnel who construct the facility, d) reducing the cost of maintaining safety at the site, e) simplifying material delivery to the room module, f) reducing crane time, and g) providing simplified quality control. Material cost reduction can be accomplished by shipping the raw materials directly to the site, thereby avoiding the intervening process of batching, mixing and transporting the ready mix concrete. The mobility and adaptability of the RCM provide economy because the cost of providing the factory can be amortized over numerous building projects, thereby reducing the cost per module. RCM is designed in sections as described above, and the sections are selected to maximize the standard components that can be used repeatedly regardless of module dimensions, and minimize the custom components that are fabricated for a specific set of module dimensions. An additional benefit is that layout work by contractors can be avoided and all demising wall construction in metal stud walls can be avoided.

Finance cost reduction for the building facility is enabled by a reduction in the principle cost of the facility and by a reduction in the time required for the project from the start of construction to occupancy.

Summary of the Design Flexibility Provided

Referring again to FIG. 1, the modular configurations, the variable dimensions and the mobile factory enabled by the RCM disclosed herein provide design flexibility for the architect of the new building into which they are incorporated. This flexibility enables use of the modules in virtually any type of multi-dwelling-unit facility such as dormitories, hotels, apartment buildings, hospitals, and assisted living facilities. The RCM facilitates a mobile factory, which means components of the RCM and factory can be loaded onto trucks and shipped to a site at or near the proposed new building, where it is then assembled ready for production. After completion of the new building project, the factory components can be disassembled, loaded back onto trucks and shipped back to the source location or to another project. The factory components are adaptable so they can provide the flexibility described above, but also so they can be used on any number of different building projects. This mobility removes the constraints imposed by over-the-road trucking laws that restrict the module size and weight. The larger and heavier modules enabled by the mobility of the factory allow more design flexibility. Constructing the exterior wall after the modules are erected enables the project architect to provide any aesthetic appearance for the exterior of the completed facility. If the module extender is used, it can include the exterior wall if desired by the architect. The transverse walls provide strength to the module to facilitate casting, handling and erection of larger modules and multi-unit modules, and they allow installation of additional components, such as a bathroom, kitchen, surface finishes and furniture, into the module before erection of the module into the building structure. They also enable the use of house wrap weather protection for the completed module until it is erected into the building. The factory forms for the walls can be adjusted to allow for varying room sizes within a module. The thickness of the walls can also be adjusted to provide additional strength for the modules in the lower portions of a multi-story structure where the supported weights are greater due to the modules stacked above. In the lower floors of taller structures where additional wall strength is required, the module end walls can be provided with an optional dimpled finish on the gap side of the wall. This feature facilitates grouting the gap between the two adjacent end walls after erection to accomplish composite action, which enables two adjacent end walls and the grout between them to act as a single thicker concrete wall. The module floor can be designed with any thickness and reinforcing (including optional pre-stressed steel). The bottom surface, which is the ceiling of the module below (in the erected building), can be a flat slab or a waffle slab and can have any other type of architectural expression cast into it. These design flexibilities of the floor and walls are enabled by the orientation of the module as it is cast. The factory includes one or more module casting station, one or more module finishing station and the transport trailers needed to move the modules about at the building site. The building contractor is provided the flexibility to control the sequence and timing of the project by electing to use one or more of each type of station and thereby coordinating the module production with the building erection and other site construction activities. When the design of the building allows use of modules of a size and weight that are within the roadway trucking constraints, the mobile factory can be assembled within an existing factory or vacant existing building near the new project site.

Environmental Advantages

The entire module is made of concrete, and the anticipated useful life is 100 years or more. Waste materials are captured and recycled. The mobile factory components are designed to be re-used on multiple projects and spent materials are recycled. Raw materials are delivered once to the project site, avoiding deliveries to other factories before transporting the finished product to the site.

Casting Process

As will be recognized from the foregoing description, aspects of the invention contemplate a casting process that includes the step of casting modular volumetric component in an orientation in which the floor of the component is cast in a vertical direction and the transverse walls extend horizontally. Moreover, the longitudinal wall of the modular volumetric building component is cast as a top deck, which permits worker access and application of finish surfaces and other features to the longitudinal wall as it is cast. Further, the method provides that, after casting, the cast component is ejected from the RCM using ejection machines, which may be tipping machines or other implements that provide for the transfer of the cast modular component from the RCM and onto a transport in a safe, efficient and cost-effective manner.

Module Components and Features

Modules that are manufactured using the RCM disclosed herein may have various module configurations, module components and features. Referring again to FIG. 1, each module may include a concrete module floor slab 102, an interior longitudinal wall 104, and transverse walls 106A and 106B, which may be demising walls between module units when the modules are assembled in a building. The ceiling of the module will be the bottom of the floor above when the next module is stacked in place. The above-described modules are not provided with exterior longitudinal walls. An exterior longitudinal wall (not shown in FIG. 1) may be added to the finished basic module either before or after erection of the module into the building, and it can be constructed of any appropriate exterior wall system.

Referring additionally to FIG. 2, modules may be single 100, double 200 or triple 220 unit modules. Extender modules, if used, can be cast with an exterior wall, which can be full or partial height. As will be recognized by those of ordinary skill in the art, extender modules 212 may be manufactured by the RCM according to aspects of the invention by suitable modification to the forms, for example, by modification of the top deck form to cast a half-height wall as the longitudinal wall, or to eliminate the longitudinal wall altogether.

The bottom modules in a building may be supported by a foundation or basement, which may be put in place prior to assembly of volumetric modular components and not provided as part of the modular system. Similarly, the building roof may be supported by the top modules in the building assembly.

With regard to floor construction, the invention contemplates various floor configurations, such as flat, waffle or troffer slab, or other design established by the building architect. As will be recognized by those of ordinary skill in the art, the advantages offered by RCM's of the invention include improved access to the mold space that creates the module floor during casting. That is, for example, reinforcement for the floor may be added easily by installation into the mold in a vertical orientation prior to casting. The floor thickness and reinforcing can be varied to provide the strength and fire rating required. The reinforcing can be any combination of conventional reinforcing bars, pre-stressed steel, and steel, plastic and carbon fibers.

The door providing access to the units 110 is typically located in the MLW (the interior wall 104) when the building includes an interior hallway or common area. In this case, the hallway can be any width and the floor slab of the hallway can be a pre-cast concrete slab that is supported by the two opposite modules and is erected after erection of those two modules. Alternatively, the door can be located in the exterior wall if the building plan includes the public access from that side of the units. In that case, the interior wall is adjacent to the interior wall of another unit, which faces the opposite direction, and which then has its door in the exterior wall located on the other side of the building.

As shown in FIG. 1, the modules may be connected to each other in the building using field welds, if required, and/or concrete projections 120 with matching slots 140, or male and female keys, in the adjacent module along with shims and grout to provide the overall building strength required. The modules can also be adjusted to support other types of adjacent building elements such as stair and elevator structures and common area rooms. Various optional ledges 150 and metal inserts can be cast into the concrete module to facilitate attachment of these other building components.

Embedded Module Components

In addition to the reinforcement required for the module concrete to achieve the strength required for the overall building, additional optional components can be embedded into the cast concrete to facilitate the mechanical, electrical and plumbing (MEP) distribution designed by the building architect. These may include i) openings cast into the floor and walls (or cored through the floor and walls after casting) to facilitate delivery of heating, ventilating and air conditioning to the units, ii) empty conduit and junction boxes, (metal or plastic) 160 to provide electrical distribution to the units and to facilitate mounting of lighting and other electrical fixtures, iii) empty tubing for low-voltage wiring and boxes for mounting low-voltage devices iv) piping for plumbing distribution and mounting devices for plumbing fixtures, v) metal plates suitable for shimming and welding the module to another module or the roof above, vi) metal lifting devices to attach the lifting cables to the module, and vii) items embedded to facilitate attachment of the exterior wall system.

Optional Module Finishing Components and Materials

After the module is cured sufficiently for movement, it is tipped onto the transport trailer and moved to the finishing station. There it is cleaned and inspected, and any surface defects are repaired. Then optional finishing components and materials can be installed into the module to fulfill the architect's design, all of which can be prefabricated assemblies or custom built. Rooms can be installed or constructed within the module unit such as i) a bathroom including plumbing fixtures and finishes, ii) a kitchen including plumbing and cabinetry items, iii) closets, iv) door frames, doors and hardware, v) wiring of the electrical circuits and the low-voltage control wiring, vi) built-in furniture units, paint or other wall finishes.

Other supplies that will be needed to finish the rooms after erection can also be loaded into the module units to save the cost of distributing those items to the units after the modules are erected into the building, items such as paint materials, floor finishes or carpet rolls, and light fixtures.

Other Features

Optional decorative patterns can also be cast into the bottom of the floor and any of the exposed wall surfaces for aesthetic and acoustic treatment to suit the building architect's design requirements. The concrete surfaces are also suitable for direct application of paint coatings. The module configuration facilitates the building erection process in several ways. The gap provided between modules can be varied to provide erection tolerance and to facilitate vertical alignment of the modules when the wall thickness above or below is different. The configurations may be alternated in the building to obtain the benefits of interlaced construction. After the field welds are completed, the open joints are packed with non-shrink grout and caulked. Where additional wall strength is required, the walls can be cast thicker, and/or the module end walls can be provided with a dimpled finish on the gap side of the wall 170. This feature facilitates grouting the gap between the two adjacent end walls after erection to accomplish composite action as the two adjacent end walls and the grout between them act as a single thicker concrete wall. The gap between modules may also house energy absorbing devices and materials for construction in locations subject to seismic forces.

Erecting the Modules to Form Buildings

Figure 65A:
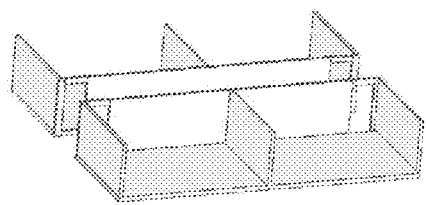
FIGS. 65A-65F illustrate volumetric modular building components being assembled into a building.
Figure 65B:
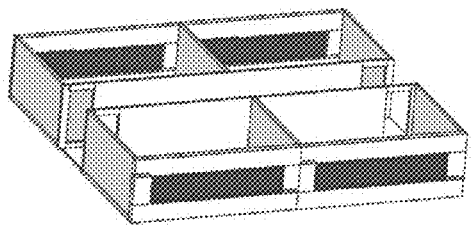
Figure 65C:
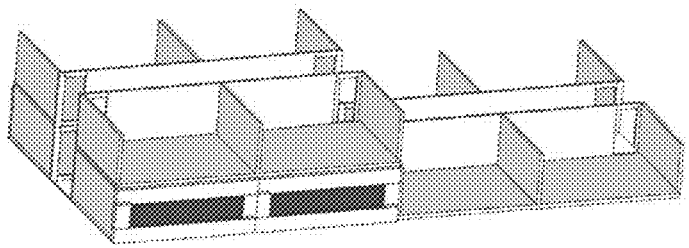
Figure 65D:
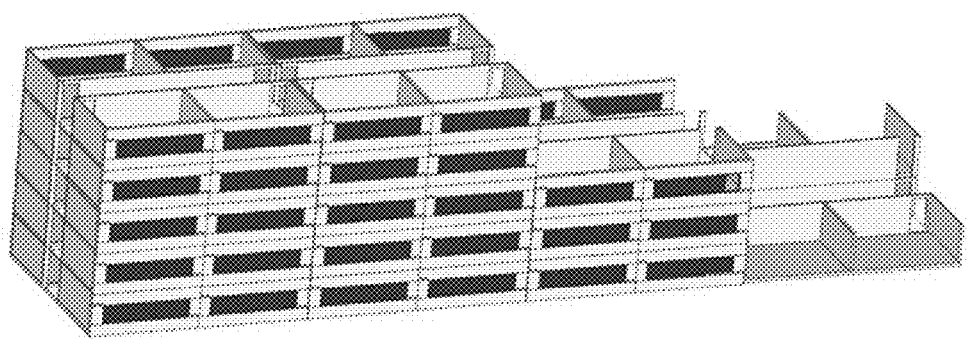
Figure 65E:
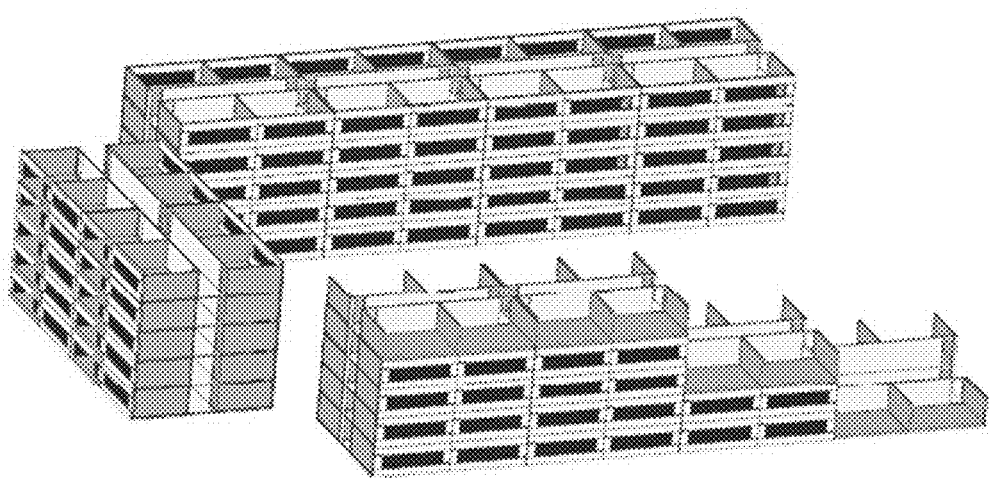
Figure 65F:
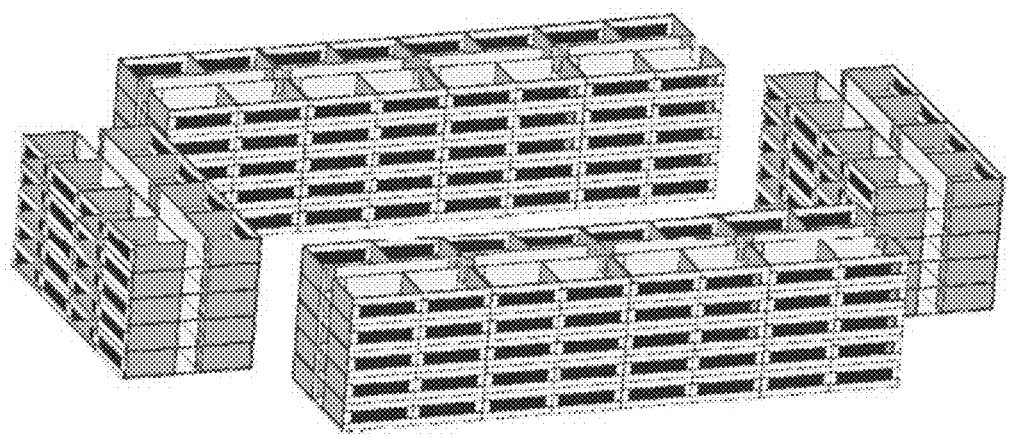

FIGS. 65A-65F illustrate the assembly of double-unit modules 212 into a building. After the modules are cast and finished they are moved by transport trailer to the building site. There they are lifted by crane off the transport trailer and set first onto the building basement or foundation and then stacked on top of each other until the building is ready for installation of the roof. In FIG. 65A, the process is begun as the first and second modules of a building example are set in place. The basement is not shown. FIG. 65A depicts the second module placed to form a corridor space or common area between the modules. FIG. 65B shows a connecting corridor slab erected between the two modules and welded to the adjacent modules as required. The exterior walls may be attached to the module either before or after the module is erected into the building. FIG. 65D shows the exterior walls and the corridor slabs, because they are erected along with the modules as the building assembly progresses. The modules may also be protected from the weather by a temporary house wrap covering (not shown) that is removed as the exterior wall is installed and as the next module is stacked on top of the top module. FIGS. 65E and 65F show a building complex constructed from a number of volumetric modular building components according to an aspect of the invention.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the basic underlying principles disclosed and claimed herein.

As an example, it will be recognized that, although the RCM is described in terms of stationary and mobile structural components, it will be understood that the invention encompasses any device in which structural components are adapted to move relative to one another, not necessarily requiring one to be stationary (anchored) and the other to be mobile (movable).

What is claimed is:

1. A portable robotic casting apparatus for casting volumetric modular building components, the apparatus comprising:
   a. a set of portable stationary structural components adapted to be assembled and secured at a casting site, in a configuration that remains stationary to support molding surfaces for molding casting material;
   b. a set of portable mobile structural components adapted to be assembled at the site in movable configurations, also to support molding surfaces, and connected to the stationary structures using a set of actuators that control the movements of the mobile structural components;
   c. a set of stationary portable molding surfaces adapted to be assembled at the site and secured to the stationary structures to form a stationary component of the mold;
   d. a set of mobile portable molding surfaces adapted to be assembled at the site and secured to the mobile structural components to cooperate with the stationary portable molding surfaces to form a mold for the volumetric modular building components, the mold defining at least two transverse walls, a longitudinal wall extending between the transverse walls, and a floor adjoining the transverse and longitudinal walls;
   e. at least one lifting mechanism for lifting and rotating the volumetric modular building components onto a transport after casting.

2. The apparatus of claim 1, wherein the volumetric modular building components are cast in a rotated position relative to the position in which the volumetric modular building components are oriented when installed as part of a building, such that the floor is cast in a vertical orientation, and the longitudinal wall is cast in a horizontal orientation above the transverse walls.

3. The apparatus of claim 1, wherein the mobile and stationary structural components are adapted to be disassembled and stored and shipped compactly.

4. The apparatus of claim 1, further comprising an electronic control system for controlling the actuators that control the movement of the mobile structural components relative to the stationary structural components.

5. The apparatus of claim 1, further comprising catwalk or other components that allow personnel to observe and access the casting space.

6. The apparatus of claim 1, further comprising first actuators for moving the mobile and stationary structural components relative to one another; second actuators for moving the molding surfaces relative to the structural components; and third actuators for moving the molding surfaces relative to each other.

7. The apparatus of claim 1, wherein the mobile and stationary structural components and molding surfaces cooperate to configure the apparatus to:
   a. a closed casting configuration in which the volumetric modular building components may be cast;
   b. an ejection configuration, in which the volumetric modular building components may be ejected from the mold and rotated onto a transport device for transport;
   c. an open reloading position, in which the molding surfaces may be accessed for preparation for casting of a subsequent volumetric modular building component.

8. The apparatus of claim 1, further comprising three-dimensional corner forms for forming interior corners on the molded volumetric modular building components.

9. An apparatus for automated casting of volumetric modular building components at a casting site, the apparatus comprising:
   at least one stationary structure secured against movement relative to the casting site;
   a plurality of stationary forms supported on the stationary structure and defining stationary molding surfaces;
   at least one mobile structure adapted for movement relative to the stationary structure between an open position and a closed position;
   a plurality of mobile forms supported on the at least one mobile structure and defining mobile molding surfaces that cooperate with the stationary molding surfaces such that when the mobile structure is in the closed position, the stationary molding surfaces and mobile molding surfaces define a mold for the volumetric building components with at least two transverse walls, a longitudinal wall extending between the transverse walls, and a floor adjoining the transverse and longitudinal walls; and
   at least one lifting mechanism for lifting and rotating the molded volumetric building components onto a transport after casting.

10. The apparatus of claim 9, wherein the mold is such that the floor is cast in a vertical orientation, and the longitudinal wall is cast in a horizontal orientation above the transverse walls.

11. The apparatus of claim 9, wherein the at least one stationary structure and the at least one mobile structure are adapted to be disassembled and stored and shipped compactly.

12. The apparatus of claim 9, further comprising actuators to cause the at least one mobile structure to move relative to the at least one stationary structure, an electronic control system for controlling actuators that control the movement of the mobile components relative to the stationary components.

13. The apparatus of claim 9, further comprising a first set of actuators for moving the at least one mobile structure relative to the at least one stationary structure, and a second set of actuators for moving the mobile forms relative to the at least one mobile structure.

14. The apparatus of claim 9, wherein the at least one mobile structure includes:
   a. a first mobile structure cooperating with the stationary structure to form the transverse walls; and
   b. a second mobile structure cooperating with the stationary structure to form the floor.

15. The apparatus of claim 9, wherein the lifting mechanism further comprises a tipping arm pivotably connected to a base member.

16. The apparatus of claim 15, further comprising a tensioning system to maintain the volumetric modular building components supporting against the tipping arm as pivoting proceeds.

17. The apparatus of claim 15, further comprising an actuator for rotating the tipping arm until the module reaches a balancing point.

18. The apparatus of claim 17, further comprising a second actuator for allowing the volumetric building components to slide downward after the balancing point is reached.

19. The apparatus of claim 9, wherein the at least one lifting mechanism comprises a respective lifting mechanism for each of the at least two transverse walls, each lifting mechanism being adapted to apply a lifting force to a respective one of the at least two transverse walls.

20. An apparatus for automated casting of volumetric modular building components at a casting site, the apparatus comprising:
   at least one stationary structure secured against movement relative to the casting site;
   a plurality of stationary forms supported on the stationary structure and defining stationary molding surfaces;
   at least one mobile structure adapted for movement relative to the stationary structure between an open position and a closed position;

a plurality of mobile forms supported on the at least one mobile structure and defining mobile molding surfaces that cooperate with the stationary molding surfaces such that when the mobile structure is in the closed position, the stationary molding surfaces and mobile molding surfaces define a mold for the volumetric building components with at least two transverse walls, a longitudinal wall extending between the transverse walls, and a floor adjoining the transverse and longitudinal walls;

the at least one stationary structure including an A-structure to anchor the apparatus to a support surface at the casting site and a D-structure disposed under the floor for supporting the weight of the floors of the volumetric building components;

the at least one mobile structure including a row of B structures for supporting the mobile molding surfaces that define, at least in part, the transverse walls and a C structure for supporting the mobile molding surfaces that define, at least in part, the mobile molding surfaces that define the floor; and at least one lifting mechanism for lifting and rotating the molded volumetric building components onto a transport after casting, the at least one lifting mechanism including a respective lifting mechanism disposed beneath each of the at least two transverse walls for applying a lifting force thereto.

* * * * *